US009836058B2

(12) United States Patent  
Pollock

(10) Patent No.: US 9,836,058 B2  
(45) Date of Patent: *Dec. 5, 2017

(54) ATTRIBUTED ROADWAY TRAJECTORIES FOR SELF-DRIVING VEHICLES

(71) Applicant: GEODIGITAL INTERNATIONAL INC., Atlanta, GA (US)

(72) Inventor: Richard James Pollock, Aurora (CA)

(73) Assignee: GEODIGITAL INTERNATIONAL INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,251

(22) Filed: Jan. 18, 2017

(65) Prior Publication Data

US 2017/0123427 A1    May 4, 2017

Related U.S. Application Data

(63) Continuation of application No. 15/048,379, filed on Feb. 19, 2016, now Pat. No. 9,568,916, which is a continuation of application No. 14/790,706, filed on Jul. 2, 2015, now Pat. No. 9,285,805.

(51) Int. Cl.
  *G01C 22/00* (2006.01)
  *G05D 1/02* (2006.01)
  *G01C 21/30* (2006.01)

(52) U.S. Cl.
  CPC ........... *G05D 1/0212* (2013.01); *G01C 21/30* (2013.01); *G05D 2201/0213* (2013.01)

(58) Field of Classification Search
  CPC ............................. G05D 1/0212; G01C 21/30
  See application file for complete search history.

(56) References Cited

U.S. PATENT DOCUMENTS

| | | | |
|---|---|---|---|
| 9,285,805 B1 * | 3/2016 | Pollock | G01C 21/32 |
| 2008/0046150 A1 | 2/2008 | Breed | |
| 2011/0082566 A1 * | 4/2011 | Herr | A61F 2/60 623/24 |
| 2011/0117903 A1 | 5/2011 | Bradley | |
| 2012/0191332 A1 | 7/2012 | Sawhill | |

* cited by examiner

*Primary Examiner* — Adam Alharbi  
(74) *Attorney, Agent, or Firm* — Millen, White, Zelano & Branigan, P.C.; William Nixon

(57) ABSTRACT

An attributed roadway trajectory comprises at least one ordered series of attributed roadway trajectory points, which are spaced along a curve that is defined in a terrestrial coordinate frame and tracks an along-roadway physical feature of a real-world roadway segment portrayed in a point cloud. Any arbitrary attributed roadway trajectory point on the curve passes a predetermined proximity test for proximity to point cloud points discriminated as representing part of the along-roadway physical feature. Each attributed roadway trajectory point has at least one attribute value representing a characteristic of the real-world roadway segment at a position on the real-world roadway segment spatially associated with the attributed roadway trajectory point. A control system of a self-driving road vehicle can use the attribute value(s) to adjust control of the self-driving road vehicle based on sensor-independent roadway data (e.g. where the position of the attributed roadway trajectory point(s) remains outside of sensor range).

17 Claims, 13 Drawing Sheets

ATTRIBUTED ROADWAY TRAJECTORIES FOR SELF-DRIVING VEHICLES

TECHNICAL FIELD

The present disclosure relates to roadway models, and more particularly to generation of attributed roadway trajectories for self-driving and assisted-driving road vehicles.

BACKGROUND

Self-driving road vehicles can travel autonomously on a roadway without human intervention, and can at least autonomously maintain lane/road position while avoiding collisions. In some cases, a self-driving road vehicle can also independently navigate along a series of roadways from an initial position to a destination without human intervention; these types of self-driving road vehicles are referred to as "automatic-driving road vehicles". In other cases, referred to as "assisted-driving road vehicles", although the self-driving road vehicle can autonomously maintain lane/road position while avoiding collisions, and may also perform some additional driving tasks autonomously, the navigation tasks must be performed by a human operator. Assisted-driving vehicles may be considered to have a more sophisticated form of cruise control. For example, an assisted-driving road vehicle could maintain a constant speed (subject to speed reduction for collision avoidance) within a given highway lane indefinitely, but it would be up to a human operator to take manual control of the vehicle and navigate off the highway at the appropriate exit. The term "self-driving road vehicle", as used herein, refers to road vehicles that can at least autonomously maintain lane/road position while avoiding collisions, and encompasses both assisted-driving road vehicles and automatic-driving road vehicles.

Self-driving road vehicles rely on an array of sensors and a roadway model representing features of the roadway on which the road vehicle is travelling. The roadway model is derived from survey data of the roadways (e.g., point clouds, geo-referenced images) acquired on an earlier date. The control system, typically incorporating an onboard computer, uses the sensors to obtain data about the environment. Useful information is then extracted from these sensor data by computing hardware and software. The information obtained from the sensors can then be used in conjunction with the roadway model to perform navigation or other autonomous driving functions, including directing the road vehicle along the roadway toward a destination, compliance with traffic signals, speed limits and other legal requirements, and avoiding collisions with pedestrians and other vehicles.

There is a limit to the information that can be extracted from data captured by onboard vehicle sensors. Some relevant information sources may be outside the field of view of those sensors, some information (e.g. legal information) may not be amenable to extraction from sensed data, and there may be practical limits on the amount of sensor data that can be captured and processed in real time. While some of these issues can be obviated with more sophisticated and powerful sensors and additional processing capability, this does not completely resolve the issues and also increases vehicle cost and complexity

SUMMARY

The present disclosure describes roadway models for use with self-driving road vehicles, as well as exemplary methods for generating these roadway models. The roadway models described herein may be used by self-driving road vehicles as a source of information about the roadway being driven that is outside the range of the sensors carried by the road vehicle, cannot be detected by those sensors, or cannot be extracted in real time from the data acquired by those sensors. The roadway models described herein may be used in conjunction with conventional navigation and mapping technology used by self-driving road vehicles.

In one aspect, the present disclosure is directed to a method for pre-processing roadway data. The method comprises receiving, in a processor of a data processing system, at least one ordered series of roadway trajectory points. For each ordered series of roadway trajectory points, the roadway trajectory points are spaced along a curve that is defined in a terrestrial coordinate frame and tracks an along-roadway physical feature of a real-world roadway segment portrayed in a point cloud, and each roadway trajectory point has a position in the terrestrial coordinate frame. For any arbitrary roadway trajectory point on the curve, that roadway trajectory point passes a predetermined proximity test for proximity to point cloud points discriminated as representing part of the along-roadway physical feature. Each roadway trajectory point has at least one roadway attribute. For each roadway trajectory point in the ordered series of roadway trajectory points, the processor evaluates at least one predefined characteristic of the real-world roadway segment at a position on the real-world roadway segment that is spatially associated with the roadway trajectory point to generate an attribute value for each predefined characteristic, and assigns each attribute value to the corresponding roadway attribute of the roadway trajectory point. This method generates an attributed roadway trajectory for use in a control system of a self-driving road vehicle.

In a preferred embodiment, the roadway trajectory points are uniformly spaced along the curve.

In some embodiments, the at least one ordered series of roadway trajectory points comprises a plurality of ordered series of roadway trajectory points. Boundaries between the ordered series of roadway trajectory points are defined by discontinuities between the curve of a preceding one of the series of roadway trajectory points and the curve of a subsequent one of the series of roadway points, and the discontinuities between the curves are associated with respective corresponding discontinuities in the along-roadway physical feature.

The roadway attribute(s) may comprise at least one non-geometric roadway attribute. In such embodiments, evaluating the predefined characteristic(s) of the real-world roadway segment and assigning each attribute value to the corresponding roadway attribute of the roadway trajectory point may comprise the use of landmark points. In one implementation, the processor receives a set of landmark points, with each landmark point having a position in the terrestrial coordinate frame and having at least one landmark attribute characterizing that landmark point. For each landmark point, the processor locates a closest roadway trajectory point that is horizontally closest to that landmark point and tests a horizontal distance between that landmark point and the closest roadway trajectory point against a maximum distance threshold. Responsive to the horizontal distance being less than or equal to the maximum distance threshold, the processor assigns at least one attribute value to a corresponding at least one roadway attribute of the closest roadway trajectory point according to at least one corresponding landmark attribute.

The set of landmark points may comprise a plurality of landmark points of different landmark types.

The roadway attribute(s) may comprise at least one non-geometric roadway attribute and/or at least one geometric roadway attribute, and the geometric roadway attribute(s) may comprise at least one road surface geometric roadway attribute and/or at least one trajectory curve geometric roadway attribute. The road surface geometric roadway attribute(s) may comprise at least one of road surface along-trajectory slope and cross-trajectory slope, and the trajectory curve geometric roadway attribute(s) may comprise at least one of heading, horizontal curvature, and vertical curvature.

In another aspect, the present disclosure is directed to a self-driving road vehicle. The self-driving road vehicle comprises a body, a locomotion system coupled to the body for accelerating, propelling and decelerating the vehicle along a roadway, a steering system coupled to the body for steering the vehicle, a sensor array carried by the body for sensing driving data, the sensor array having a sensor range, and a control system carried by the body. The control system is coupled to the sensor array for receiving sensed driving data from the sensor array, the control system is coupled to the locomotion system for controlling the locomotion system, and the control system is also coupled to the steering system for controlling the steering system. A data storage module is coupled to and accessible by the control system; the data storage module stores at least one attributed roadway trajectory. Each attributed roadway trajectory comprises at least one ordered series of attributed roadway trajectory points. For each ordered series of attributed roadway trajectory points, the attributed roadway trajectory points are spaced along a curve defined in a terrestrial coordinate frame and tracking an along-roadway physical feature of a real-world roadway segment portrayed in a point cloud. For any arbitrary attributed roadway trajectory point on the curve, that attributed roadway trajectory point passes a predetermined proximity test for proximity to point cloud points discriminated as representing part of the along-roadway physical feature. Each attributed roadway trajectory point has, in addition to its position in the terrestrial coordinate frame, at least one roadway attribute having a respective attribute value. Each attribute value represents a characteristic of the real-world roadway segment at a position on the real-world roadway segment that is spatially associated with the attributed roadway trajectory point. The control system is configured to obtain, for at least one of the attributed roadway trajectory points, at least one respective attribute value representing sensor-independent roadway data and to use the attribute value(s) to adjust control of the locomotion system and/or the steering system.

In certain preferred embodiments, the control system is configured to obtain respective attribute value(s) representing sensor-independent roadway data while the position in the terrestrial coordinate frame of the respective attributed roadway trajectory point(s) corresponds to a terrestrial position outside of the sensor range of the sensor array. In such embodiments, the control system may be further configured to use the attribute value(s) to adjust control of the locomotion system and/or the steering system while the position in the terrestrial coordinate frame of the respective attributed roadway trajectory point(s) corresponds to a terrestrial position outside of the sensor range of the sensor array.

In a further aspect, the present disclosure is directed to a method for controlling a self-driving road vehicle. According to the method, a control system of the self-driving road vehicle accesses an attributed roadway trajectory. The attributed roadway trajectory comprises at least one ordered series of attributed roadway trajectory points. For each ordered series of attributed roadway trajectory points, the attributed roadway trajectory points are spaced along a curve defined in a terrestrial coordinate frame and tracking an along-roadway physical feature of a real-world roadway segment portrayed in a point cloud. For any arbitrary attributed roadway trajectory point on the curve, that attributed roadway trajectory point passes a predetermined proximity test for proximity to point cloud points discriminated as representing part of the along-roadway physical feature. Each attributed roadway trajectory point has, in addition to its position in the terrestrial coordinate frame, at least one roadway attribute having a respective attribute value. Each attribute value represents a characteristic of the real-world roadway segment at a position on the real-world roadway segment that is spatially associated with the attributed roadway trajectory point. The control system of the self-driving road vehicle obtains, for at least one of the attributed roadway trajectory points, at least one respective attribute value representing sensor-independent roadway data, and the control system of the self-driving road vehicle uses the attribute value(s) to adjust control of the locomotion system and/or the steering system.

In certain preferred embodiments, the control system of the self-driving road vehicle obtains the respective attribute value(s) representing sensor-independent roadway data while the position in the terrestrial coordinate frame of the respective attributed roadway trajectory point(s) corresponds to a terrestrial position outside of the sensor range of the sensor array. In these embodiments, the control system may use the attribute value(s) to adjust control of the locomotion system and/or the steering system while the position in the terrestrial coordinate frame of the respective attributed roadway trajectory point(s) corresponds to a terrestrial position outside of the sensor range of the sensor array.

In some embodiments, for both a self-driving road vehicle and a method for controlling a self-driving road vehicle, there are a plurality of ordered series of attributed roadway trajectory points. Boundaries between the ordered series of attributed roadway trajectory points may be defined by discontinuities between the curve of a preceding one of the series of attributed roadway trajectory points and the curve of a subsequent one of the series of roadway points, with the discontinuities between the curves being associated with respective corresponding discontinuities in the along-roadway physical feature.

The attributed roadway trajectory points may be uniformly spaced along the curve.

The roadway attribute(s) may comprise at least one non-geometric roadway attribute and/or at least one geometric roadway attribute, and the geometric roadway attribute(s) may comprise at least one road surface geometric roadway attribute and/or at least one trajectory curve geometric roadway attribute.

BRIEF DESCRIPTION OF THE DRAWINGS

These and other features will become more apparent from the following description in which reference is made to the appended drawings wherein.

DETAILED DESCRIPTION

The type of roadway model described herein is referred to as an "attributed roadway trajectory". The term "attributed roadway trajectory", as used herein, refers to a sequence of three-dimensional coordinates in a terrestrial coordinate frame, each of which describes a terrestrial position and height and also has a set of one or more roadway attributes having respective attribute values. The coordinates may be represented in a number of ways. For example, spherical coordinates may be used (e.g. latitude/longitude/height), or (x,y,z) values in a Cartesian terrestrial coordinate frame may be used. The attribute values are derived from legal, physical and navigational properties of the roadway and objects that exist along the roadway, as described in more detail below. A single coordinate triplet in an attributed roadway trajectory, together with its attribute value(s), is referred to herein as an "attributed roadway trajectory point".

The attributed roadway trajectory points in the attributed roadway trajectory generally follow the roadway being modeled. In preferred embodiments, the attributed roadway trajectory points in the attributed roadway trajectory sample the location of an along-roadway physical feature such as a road edge, a lane divider paint marking, or a road shoulder paint marking. In other embodiments, the trajectory points may sample, for example, a calculated midpoint of a lane. The sequence of the attributed roadway trajectory points matches the driving direction of the roadway that includes the physical feature—the second point in the sequence spatially follows the first in the driving direction, the third point in the sequence spatially follows the second in driving direction, and so on. The attributed roadway trajectory points are spaced, preferably uniformly, along a mathematically defined curve in three dimensions that intersects the coordinate triplets of the attributed roadway trajectory points.

Figure 1:
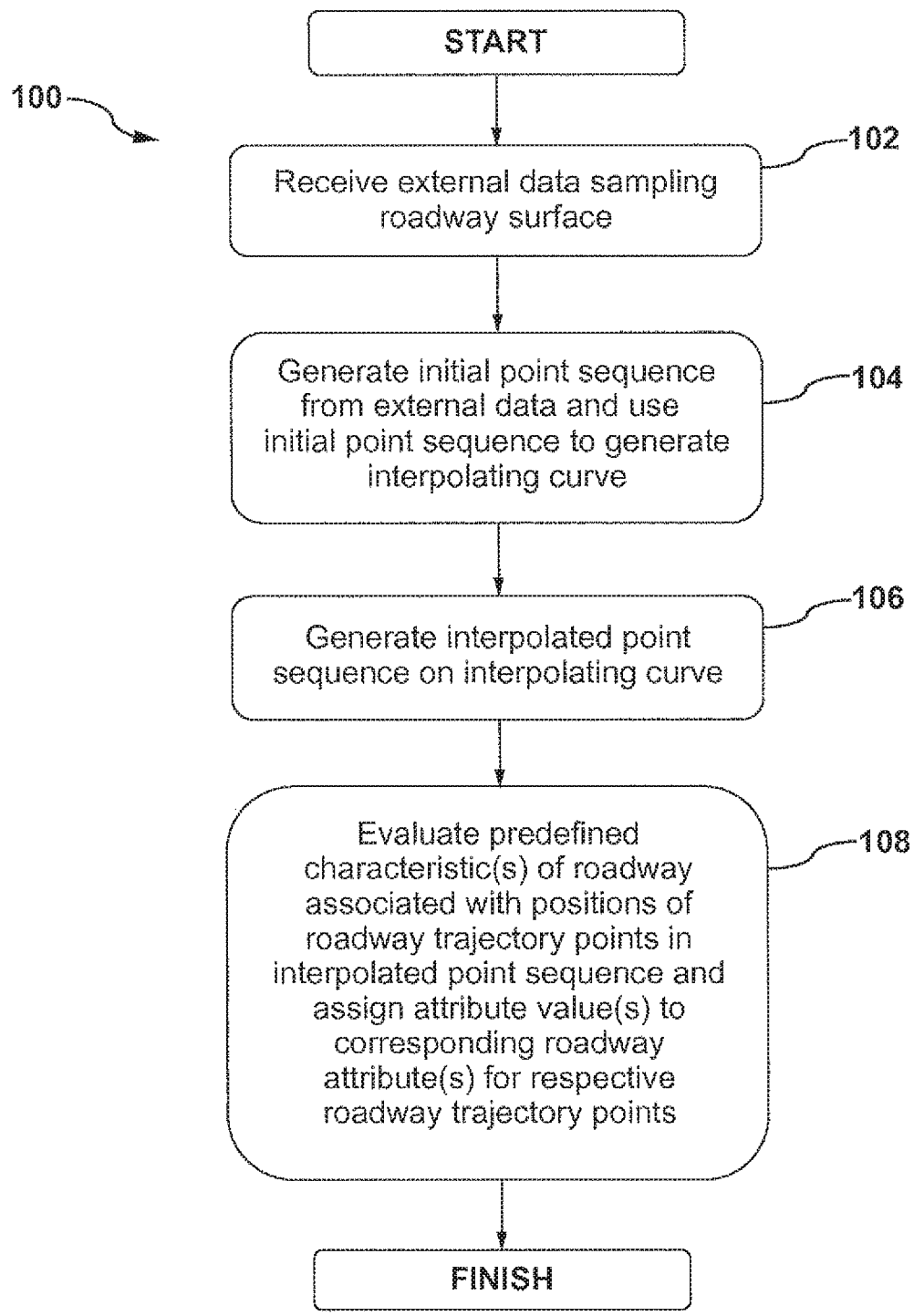
FIG. 1 is a high-level flow chart showing an exemplary method for generating an attributed roadway trajectory.

Reference is now made to FIG. 1, which is a high-level flow chart showing an exemplary method 100 for generating an attributed roadway trajectory. At step 102, the method 100 receives external data sampling a roadway surface, and at step 104 the method 100 generates an initial point sequence, typically non-uniformly spaced, from the external data; this initial point sequence is used to generate an interpolating curve and the points in that initial point sequence are referred to herein as "sample points" since they are the samples used to generate the interpolating curve. At step 106, the method 100 generates an interpolated point sequence on the interpolating curve; thus, the interpolated point sequence is generated from the initial point sequence. The points in the interpolated point sequence are referred to herein as "roadway trajectory points". At step 108 the method 100 evaluates one or more predefined characteristics of the roadway associated with the positions of the roadway trajectory points in the interpolated point sequence and assigns one or more attribute values to corresponding roadway attributes for the respective roadway trajectory points. The result of step 108 is an interpolated point sequence of roadway trajectory points each having one or more roadway attributes with assigned attribute values, in other words, an attributed roadway trajectory. Each of steps 102 to 108 is described in greater detail below.

The geometric calculations performed at each of steps 102 to 108 are preferably performed in a locally level Cartesian coordinate frame. The term "locally level" refers to a Cartesian coordinate frame whose (x, y) plane, at origin, is tangent to an ellipsoid representing the Earth's surface and whose positive y-axis points true north at the origin and whose positive z-axis points away from the Earth's notional center. As such, as used herein, the terms "horizontal", "horizontally", "horizontal distance" and related terms refer to measurement in the (x, y) plane of a the locally level Cartesian coordinate frame, and the term "vertical" refers to the direction of the z-axis.

It is to be appreciated that the point cloud points, landmark points (as described further below) sample points, roadway trajectory points and attributed roadway trajectory points (along with certain roadway attributes) may be represented in some other terrestrial coordinate frame other than a locally level Cartesian coordinate frame. In such embodiments they may transformed into the relevant locally level Cartesian coordinate frame for the purpose of geometric calculation and the results of the geometric calculations may be transformed back to the original terrestrial coordinate frame. While one skilled in the art could equivalently perform the geometric calculations directly within the original terrestrial coordinate frame, such calculations would implicitly include transformation to and from a locally level Cartesian coordinate frame and it is therefore considered more straightforward to transform the coordinates and perform the calculations after transformation into the locally level Cartesian coordinate frame.

Figure 2:
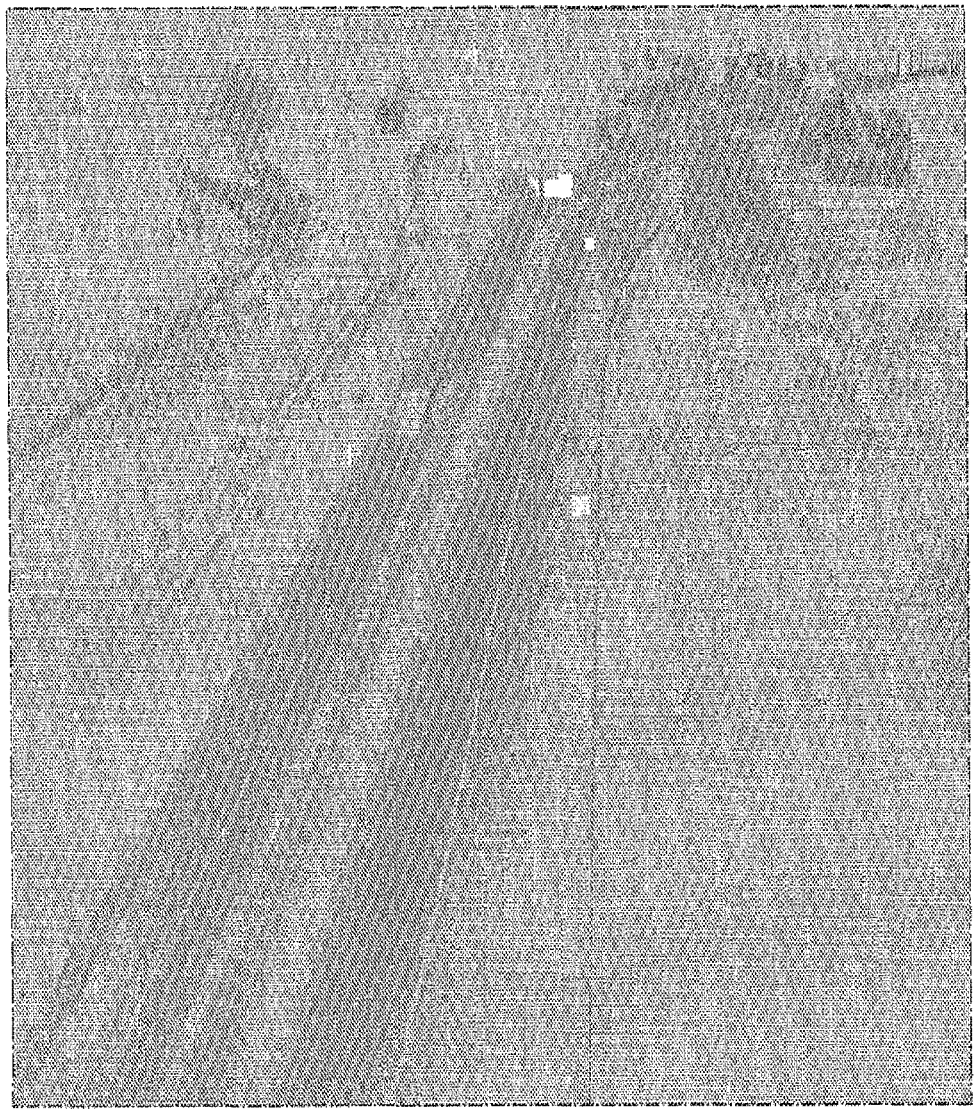
FIG. 2 shows an exemplary point cloud display for a roadway area.

The external data received at step 102 generally includes point clouds for the relevant roadway area. A point cloud for a roadway area is a set of regularly or non-regularly distributed three-dimensional coordinates in a terrestrial coordinate frame that sample the roadway surface and surfaces adjacent to the roadway. When the terrestrial coordinate frame is Cartesian, each coordinate in the point cloud will be represented by an (x,y,z) coordinate triplet. Each coordinate in the point cloud has an intensity value; the intensity value for a coordinate in the point cloud is related to the light reflectance in a specific wavelength interval of the surface that is sampled by that coordinate. The coordinates in a point cloud, together with their intensity values, are referred to herein as "point cloud points". A point cloud may be displayed with hardware and software to provide monochrome renderings of views of the roadway and its surroundings. FIG. 2 shows an exemplary point cloud for a roadway area.

Normally, the point clouds are generated from data acquired with a Light Detection and Ranging (LIDAR) system designed for outdoor surveying applications and operated from a road vehicle or aircraft. Multiple such systems are available from multiple vendors, along with software that transforms the raw data acquired by the system into point clouds. The system/software is chosen such that the density of the point cloud and its intensity values will support feature tracking with the necessary accuracy. The density of the point cloud and its intensity values must reveal the along-roadway physical feature that is to be tracked by the attributed roadway trajectory (e.g., a lane divider paint marking, road edge, road shoulder paint marking). In addition, the density of the point cloud and its intensity values, and the accuracy with which the samples are referenced to the terrestrial coordinate frame (i.e., the geo-referencing accuracy of the samples) must be fine enough to support the production of an attributed roadway trajectory that has the geo-referencing accuracy required by its intended application. In one preferred self-driving road vehicle embodiment, for example, lane centering operations may require that the coordinates in the terrestrial coordinate frame for each trajectory point be within 10 centimeters of the true global position.

Referring again to FIG. 1, step 104 generates a sequence of three-dimensional terrestrial coordinates that sample the position of the chosen along-roadway physical feature (e.g., a lane divider paint marking, road edge, road shoulder paint marking), as portrayed in one or more input point clouds received at step 102, these coordinates are referred to as "sample points". The sample points in the sequence generated at step 104 are similar to the attributed roadway trajectory points that will result from step 108, in that they are defined in the same coordinate frame, represent the same along-roadway physical feature, and are sequenced to match the driving direction. The sample points in the sequence generated at step 104 are different from the attributed roadway trajectory points in that (i) they are typically more widely spaced than the attributed roadway trajectory points; and (ii) they do not have attribute values that are derived from properties of the roadway and objects that exist along the roadway. As indicated above, the output of step 104 is referred to as an "initial point sequence".

The initial point sequence may be generated with one of many different procedures; in certain currently preferred embodiments, step 104 involves human interaction with a software tool although automation of this step 104 is also contemplated. The feasibility of automation depends on the along-roadway physical feature and how it is portrayed in the point cloud. Certain procedures for determining the acceptability of an initial point sequence will now be described.

In general, the sample points are derived from one or more point clouds that portray the stretch of roadway and the along-roadway physical feature (e.g., a lane divider paint marking, road edge, road shoulder paint marking), that is of interest. A single sample point in the initial point sequence may have the same coordinates as a single point cloud point, or be calculated from the coordinates of a neighbourhood of point cloud points. In either case, the sample points must be sequenced to match the driving direction, and the distribution of sample points must be such that an interpolating curve generated from the initial point sequence is acceptable input data for step 106, as described below.

The initial point sequence is used to generate a curve that interpolates the initial point sequence and is intended to track the along-roadway physical feature; this curve is referred to as an "interpolating curve". It will be appreciated that where the along-roadway physical feature generally follows a straight line (e.g. over a long, straight stretch of highway), the curve will also follow a straight line; in this context a straight line is merely a special case of a curve in which the curvature is zero.

The interpolating curve will be used in step 106 and therefore step 104 includes an iterative process of acceptance testing and adjustment for the interpolating curve using a distance threshold. Test points on the interpolating curve must have, except where the test point is opposite a gap in the along-roadway physical feature (e.g. spaces between individual markings in a dashed lane marker), a perpendicular distance to the along-roadway physical feature that is no greater than a specified distance threshold. Thus, for each test point on the interpolating curve, that test point either (a) passes a predetermined proximity test for proximity to point cloud points that have been discriminated as representing part of the along-roadway physical feature, or (b) is associated with a gap in the along-roadway physical feature. Preferably, the test points are uniformly spaced.

If the point cloud points that comprise the along-roadway physical feature can be automatically extracted and if gaps in the along-roadway physical feature can be automatically localized, then the acceptability of the interpolating curve may be automatically determined by computing an estimate of the perpendicular distance to the along-roadway physical feature at each test point (i.e. each "step" increment in the case of uniformly spaced test points) along the interpolating curve that is not opposite a gap in the along-roadway physical feature. Where the interpolated point sequence resulting from step 106 (described below) will be uniformly spaced, the step value is the specified uniform curve length between adjacent uniformly spaced points that will be used in step 106. Only if none of these estimated perpendicular distances are greater than the threshold is the interpolating curve acceptable. If the interpolating curve is not acceptable, then sample points must be removed and/or added to the initial point sequence in the vicinity of interpolating curve locations at which the distance threshold is exceeded, and the interpolating curve recalculated, until the interpolating curve becomes acceptable.

Figure 3:
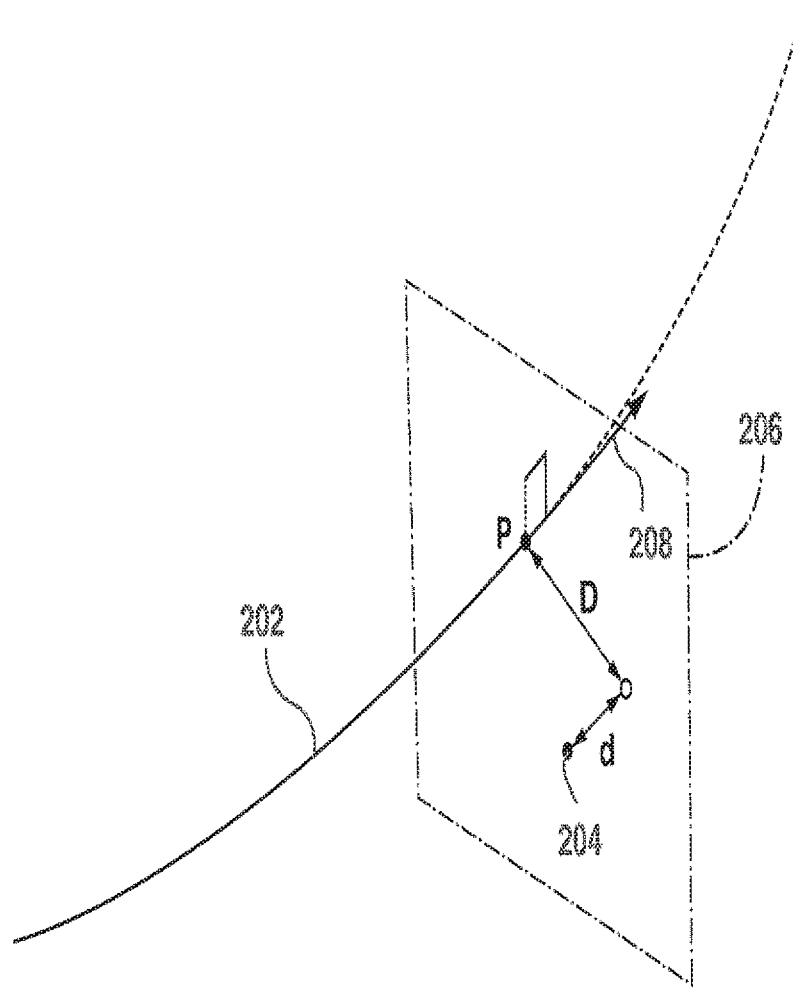
FIG. 3 is a schematic illustration of a method for estimating perpendicular distance between a test point on an interpolating curve and a point cloud point discriminated as sampling an along-roadway physical feature.

Referring now to FIG. 3, an estimate of the perpendicular distance D between a test point P on the interpolating curve 202 and a point cloud point (e.g. point cloud point 204) discriminated as sampling the along-roadway physical feature is calculated as follows. A notional plane 206 is defined that is normal to the interpolating curve 202 at that test point P (i.e. normal to the tangent 208 at that test point P). The procedure then finds all point cloud points (e.g. point cloud point 204) that are discriminated as sampling the along-roadway physical feature and have a perpendicular distance d to the plane of no more than half the distance threshold. If there are no such point cloud points, then the location violates the distance threshold. If there are such point cloud points, then only if at least one of them has a distance D on the plane 206 to the test point P on the interpolating curve 202 that is no greater than the distance threshold does the interpolating curve 202 not violate the distance threshold at test point P.

Figure 4:
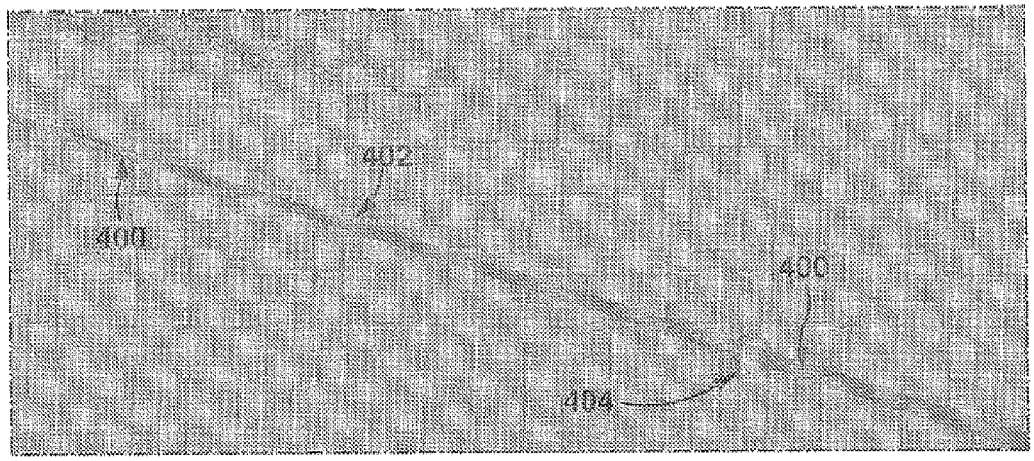
FIG. 4 is an exemplary display of point cloud points together with a tube whose central axis is an interpolating curve and whose radius is a distance threshold.

If the point cloud points that comprise the along-roadway physical feature cannot be automatically extracted, then the acceptability of the interpolating curve may be determined by manually inspecting a display of the point cloud points together with a tube whose central axis is the interpolating curve and whose radius is the distance threshold, as shown in FIG. 4. Point cloud points that discriminate part of the along-roadway physical feature 400 are displayed brightly because of the intensity value associated with them (in this case these point cloud points discriminate a dashed lane marker). The tube 402 contains the point cloud points that discriminate the along-roadway physical feature, and a sphere 404 is rendered for each sample point such that the sample point is at the center of the sphere 404. The interpolating curve is only acceptable if the point cloud points sampling the along-roadway physical feature intersect the surface of the tube or are inside the tube everywhere except where there are gaps in the along-roadway physical feature; this is shown to be the case in FIG. 4 for part of a dashed lane marker along roadway physical feature. If the interpolating curve is not acceptable, then sample points must be removed or added to the initial point sequence in the vicinity of interpolating curve locations at which the distance threshold is exceeded until the interpolating curve becomes acceptable. The marking of the locations of the sample points by way of a sphere 404 and the availability of appropriate editing operations in the display software assists this process.

Figure 5:
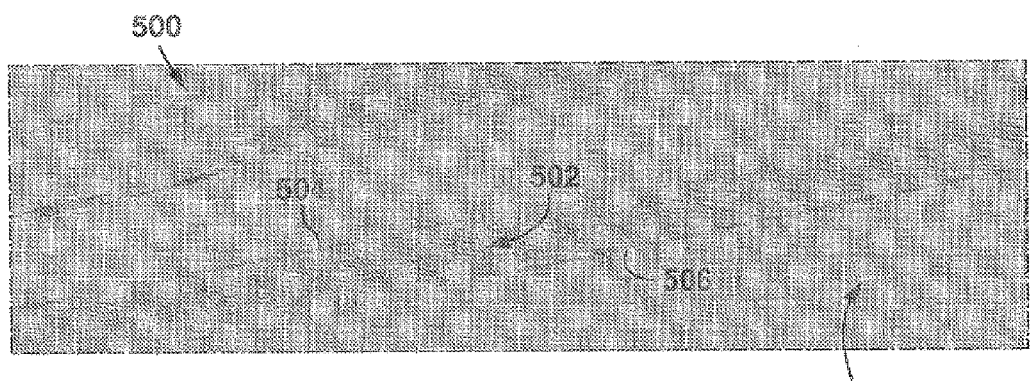
FIG. 5 shows an example of a point cloud sampling a roadway in which there is a discontinuity between a first portion of the $i^{th}$ lane divider marking and a second portion of the $i^{th}$ lane divider marking because a new lane has been added to the right edge of the road.

An along-roadway physical feature that is sampled by an initial point sequence may be discontinuous. For example, if the along-roadway physical feature is the $i^{th}$ lane divider marking from the right edge of the road, then where a new lane is added to the right edge of the road (relative to the driving direction), the $i^{th}$ lane divider marking becomes the $(i+1)^{th}$ lane divider marking. At that location, there is a discontinuity and the initial point sequence must start to sample the lane divider marking to the right. FIG. 5 shows an example of a point cloud sampling a roadway 500 in which there is a discontinuity 502 between a first portion 504 of the $i^{th}$ lane divider marking and a second portion 506 of the $i^{th}$ lane divider marking because a new lane 508 has been added to the right edge of the road. In the present embodiment, it is considered advantageous to treat a discontinuous along-roadway physical feature as a single logical entity while accounting for discontinuities. This is accomplished by dividing the initial point sequence into "sub-runs", in which the discontinuities form boundaries between sub-runs. All sample points between two discontinuities, or between a discontinuity and the start or end of the initial point sequence, belong to the same sub-run. All sample points have a sub-run attribute value (an integer type) such that all sample points in the same sub-run have the same sub-run attribute value and the last point in one sub-run and the first point in the next have different sub-run attribute values. In the initial point sequence acceptability test, the interpolating curve is not made to interpolate between points that are on a discontinuity, instead, when a discontinuity is identified, a new sub-run begins, with a new interpolating curve. Accordingly, in one embodiment step 104 (FIG. 1) interpolates each sub-run of sample points of the initial point sequence with a parametric curve, whose parameter is arc length, and each sub-run has its own interpolating curve.

This sub-run structure will be inherited from the initial point sequence by the interpolated point sequence generated at step 106, and the attributed roadway trajectory generated at step 108 will in turn inherit the sub-run structure from the interpolated point sequence. Thus, the interpolated point sequence may be made up of a series of sub-runs, and hence the attributed roadway trajectory may also be made up of a series of sub-runs. Each sub-run is an ordered series of roadway trajectory points, and therefore an interpolated point sequence that comprises a series of sub-runs comprises a plurality of ordered series of roadway trajectory points, each spaced along a respective curve. The boundaries between the ordered series of roadway trajectory points (sub-runs) that make up the interpolated point sequence are defined by discontinuities between the curve of a preceding one of the series of roadway trajectory points and the curve of a subsequent one of the series of roadway points; the discontinuities between the curves are associated with respective corresponding discontinuities in the along-roadway physical feature.

Alternatively, each sub-run of a larger interpolated point sequence or attributed roadway trajectory may be characterized as a separate, smaller interpolated point sequence or attributed roadway trajectory, respectively.

The curve function is chosen such that between the sample points in the initial point sequence, the curve will closely track the along-roadway physical feature that is sampled by those points. In the exemplary embodiment, this is supported by application of the distance threshold (either automatically or manually) as described above in respect of step 104. Where the along-roadway physical roadway feature is a lane divider or shoulder marking, an interpolating parametric cubic spline that defines a two- or three-dimensional curve (matching the dimensionality of the sample points in the initial point sequence) is suitable.

In a preferred embodiment, if the terrestrial coordinate frame of the initial point sequence has spherical coordinates (i.e., degrees latitude and longitude) for horizontal position, these spherical coordinates are transformed to coordinates in a Cartesian coordinate frame, and the interpolation and generation of the roadway trajectory points that form the interpolated point sequence are performed on the Cartesian coordinates. The coordinates of the roadway trajectory points in the interpolated point sequence may then be transformed to coordinates in the original terrestrial coordinate frame (e.g. spherical coordinates).

At step 106, the interpolating curve generated and validated at step 104 is used to calculate the three-dimensional coordinates of points on that curve. Preferably, the points are uniformly spaced, i.e. spaced at a uniform interval along the curve. The driving-direction sequence of these coordinates is the interpolated point sequence, and (as noted above) the individual points in the interpolated point sequence are referred to as "roadway trajectory points". The interpolated point sequence inherits the sub-run structure and hence the interpolating curve does not interpolate between sub-runs.

In one embodiment where the roadway trajectory points are uniformly spaced, the interpolating curve $(x,y,z)=c(t)$ is defined such that $c(0)$ is the position of the first sample point in the sub-run of an initial point sequence, m is the total curve length between the first and last sample points in the sub-run, and step is the specified uniform curve length between adjacent uniformly-spaced points. The first sample point in the sub-run will become first roadway trajectory point in the interpolated point sequence for that sub-run. The sequence of uniformly-spaced coordinates is calculated as follows:

```
t = 0;
i = 0;
while (t < m) {
    i^th coordinate pair (or triplet) = c(t);
    t = t + step;
    i= i+1;
}
```

Let n be the total curve length between the first and last roadway trajectory points in the interpolated point sequence for that sub-run. Then, 0<=m−n<step. Thus, the total curve length for the interpolated point sequence for a given sub-run will typically be shorter than the curve length for the initial point sequence for that sub-run by less than the step amount. One meter (1 m) has been empirically found to be a suitable step length where the along-roadway physical feature is a lane divider marking, shoulder marking or roadway edge.

Figure 6:
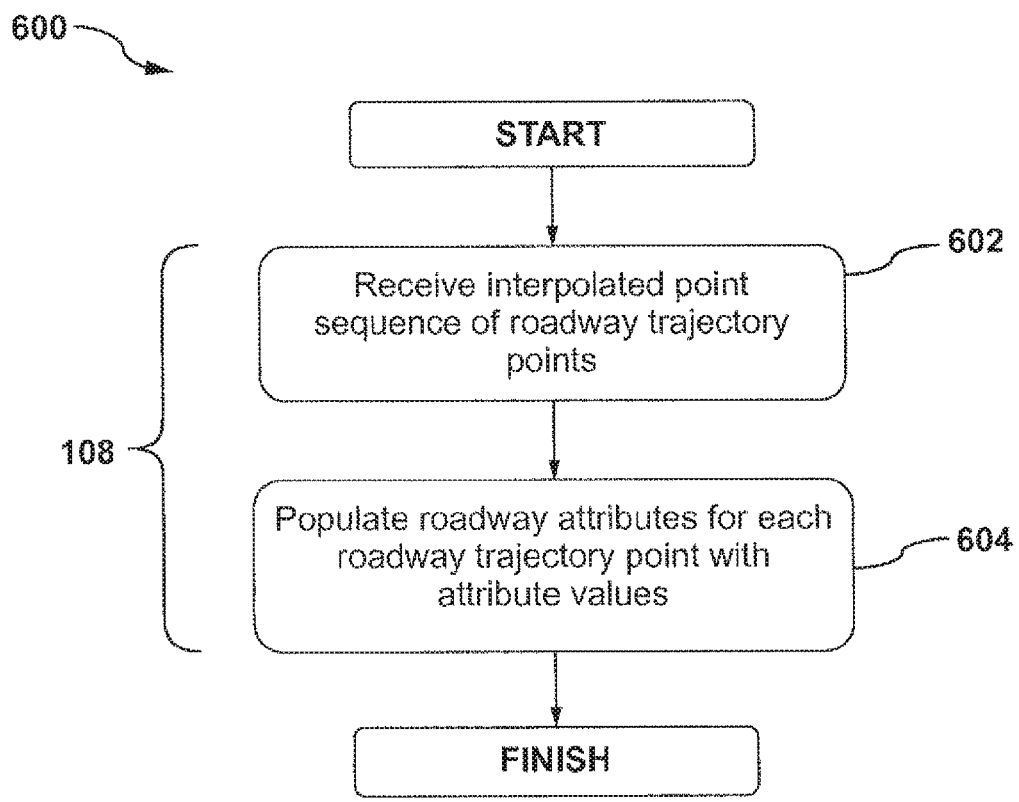
FIG. 6 is a flow chart showing an exemplary method for evaluating one or more predefined characteristics of a roadway to obtain attribute values and using the attribute values to populate roadway attributes of roadway trajectory points in an interpolated point sequence.

As noted above, at step 108, the method 100 evaluates one or more predefined characteristics of the roadway to obtain attribute values and assigns the calculated attribute values to the roadway attributes of the roadway trajectory points in the interpolated point sequence. Step 108 will now be described with greater detail in the context of FIG. 6, which is a flow chart showing an exemplary method 600 for generating an attributed roadway trajectory. Thus, the flow chart showing the method 600 is an elaboration of step 108. The method 600 is executed in a processor of a data processing system, and may be considered a method for pre-processing roadway data.

At step 602, the processor receives the interpolated point sequence of roadway trajectory points generated at step 106 of the method 100 in FIG. 1. As noted above, the interpolated point sequence will comprise at least one ordered series of roadway trajectory points, each having at least one roadway attribute. If the interpolated point sequence is made up of a series of sub-runs, there will be a plurality of ordered series of roadway trajectory points, each spaced along a respective curve, with boundaries between the ordered series of roadway trajectory points (sub-runs) defined by discontinuities between adjacent curves associated with respective corresponding discontinuities in the along-roadway physical feature. If each sub-run is treated as an independent interpolated point sequence, there will be a single ordered series of roadway trajectory points spaced along a single curve. In either case, as a result of steps 102 to 106, the curve(s) will be defined in a terrestrial coordinate frame and will track an along-roadway physical feature of a real-world roadway segment portrayed in a point cloud, and each roadway trajectory point will have a position in the terrestrial coordinate frame. Moreover, because of the acceptance testing applied at step 104, for any arbitrary roadway trajectory point on the curve, that roadway trajectory point passes a predetermined proximity test for proximity to the point cloud points that were discriminated as representing part of the along-roadway physical feature. Preferably, the roadway trajectory points are uniformly spaced along the respective curve(s).

At step 604, the processor populates the roadway attributes for each roadway trajectory point with attribute values. For each roadway trajectory point in the interpolated point sequence, the processor evaluates at least one predefined characteristic of the real-world roadway segment at a position on the real-world roadway segment that is spatially associated with the roadway trajectory point. This evaluation generates an attribute value for each predefined characteristic, and the processor then assigns each attribute value to the corresponding roadway attribute of the respective roadway trajectory point. Once all attribute values have been assigned to the corresponding roadway attributes of the respective roadway trajectory points in the interpolated point sequence, the result is an attributed roadway trajectory. As will be explained further below, the attributed roadway trajectory is used by a control system of a self-driving road vehicle.

Figure 7:
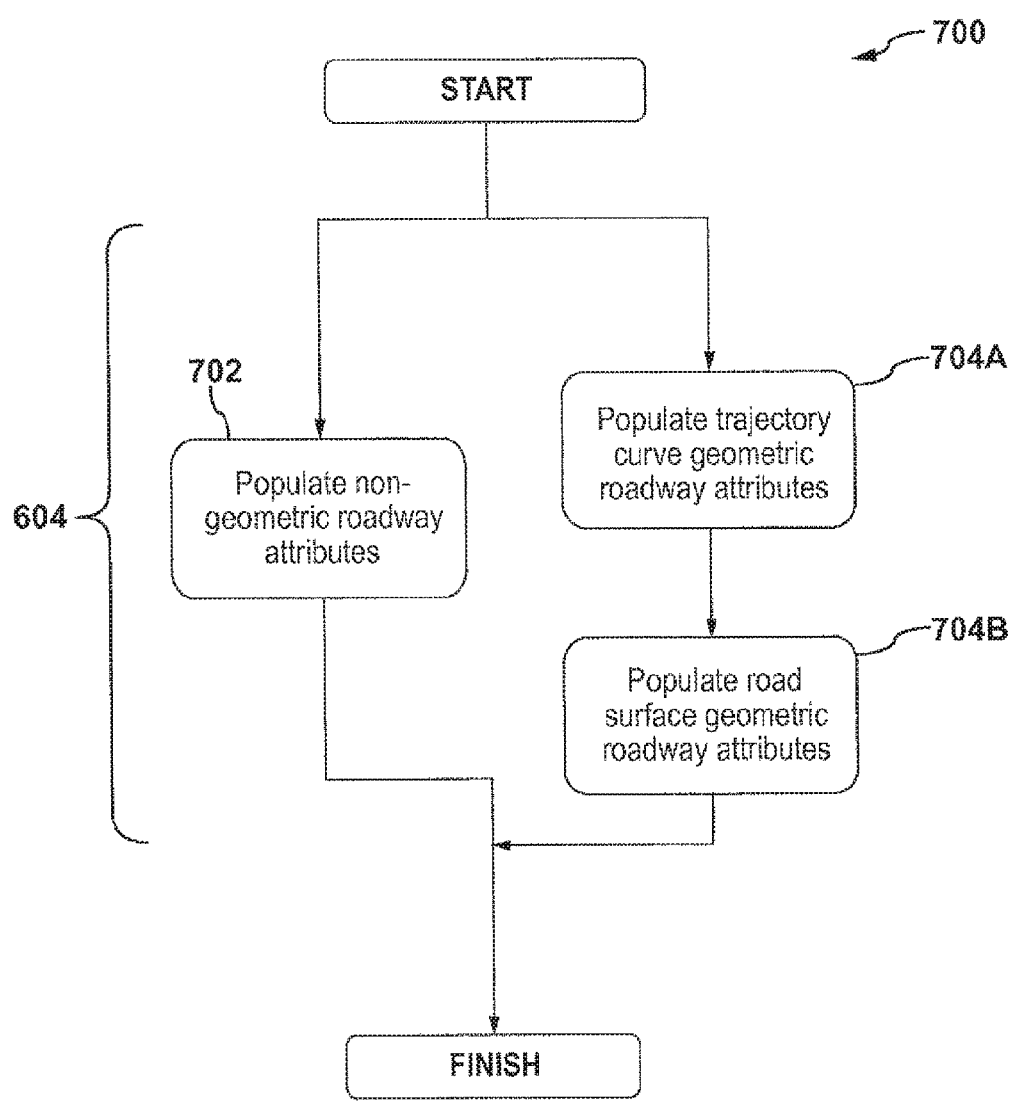
FIG. 7 is an exemplary flow chart showing population of three exemplary types of roadway attribute.

The roadway trajectory points may have various different types of roadway attribute, and hence various different types of predefined characteristics may be evaluated at step 604 to populate these roadway attributes. The roadway attributes may include non-geometric roadway attributes and geometric roadway attributes. FIG. 7 is a flow chart showing an exemplary elaboration of step 604 which delineates population of three exemplary types of roadway attribute.

At step 702, the processor populates non-geometric roadway attributes. The term "non-geometric", as used herein, refers to roadway attributes that are not related to the shape of the curve that was used to interpolate sample points in the initial point sequence or to the shape of the roadway surface. The roadway attributes populated at step 702 capture non-geometric information about the roadway (e.g., the shoulder surface material at different locations, the locations of traffic signs of different types). At step 704A the processor populates trajectory curve geometric roadway attributes and at step 704B the processor populates road surface geometric roadway attributes. Steps 702 and the combination of steps 704A and step 704B may be performed in any sequence, or substantially simultaneously, but in preferred embodiments step 704A is performed before step 704B and the output of step 704A is used as the input to step 704B.

Step 702 is now described in more detail.

Step 702 is performed on a landmark point set, that is, a set of landmark points. Landmark points are three-dimensional coordinates that are in the same terrestrial coordinate frame as the interpolated point sequence and which have one or more landmark attributes characterizing the landmark attribute. Each landmark point represents an instance of a particular landmark type. All landmark points of the same landmark type have the same landmark attributes. In some cases, a particular landmark type may not have any delineated landmark attributes; in these cases the landmark type itself can be considered an implicit landmark attribute (i.e. presence/absence of the landmark). The landmark points of a particular type comprise a set rather than a sequence (i.e., the order of the points is not significant). The set of landmark types depends on the specific intended application of the attributed trajectory. The set of landmark points for a particular landmark type is used to populate a particular set of non-geometric roadway attributes of the interpolated point sequence.

A landmark type represents either discrete objects that exist on or next to the roadway (object landmarks) or changes to continuous roadway properties (property-change landmarks). Examples of property-change landmarks are speed limit changes and changes in the drivability of the left shoulder. Object landmarks are not related to a continuous roadway property other than the absence or existence of an object. Examples of object landmarks are exit ramp starts, entrance ramp endings, and signs.

The set of points for a property-change landmark type are associated with an initial value that is the value of the roadway attribute derived from that landmark type for the first point in the interpolated point sequence. A property-change landmark point is placed along the normal of the interpolating curve at a point on the curve where the property is considered to change, within a specified horizontal threshold distance from that point on the curve.

The set of landmark points of a particular type may be generated automatically or with some degree of manual intervention, depending on the type of landmark point. In any case, this is done with a software program. Landmark points may be derived from the point cloud(s) used to generate the initial point sequence, and geo-referenced image or video data may also be used in the landmark point selection; for example, if not all of the landmark types are clearly portrayed in the point cloud(s).

Figure 8:
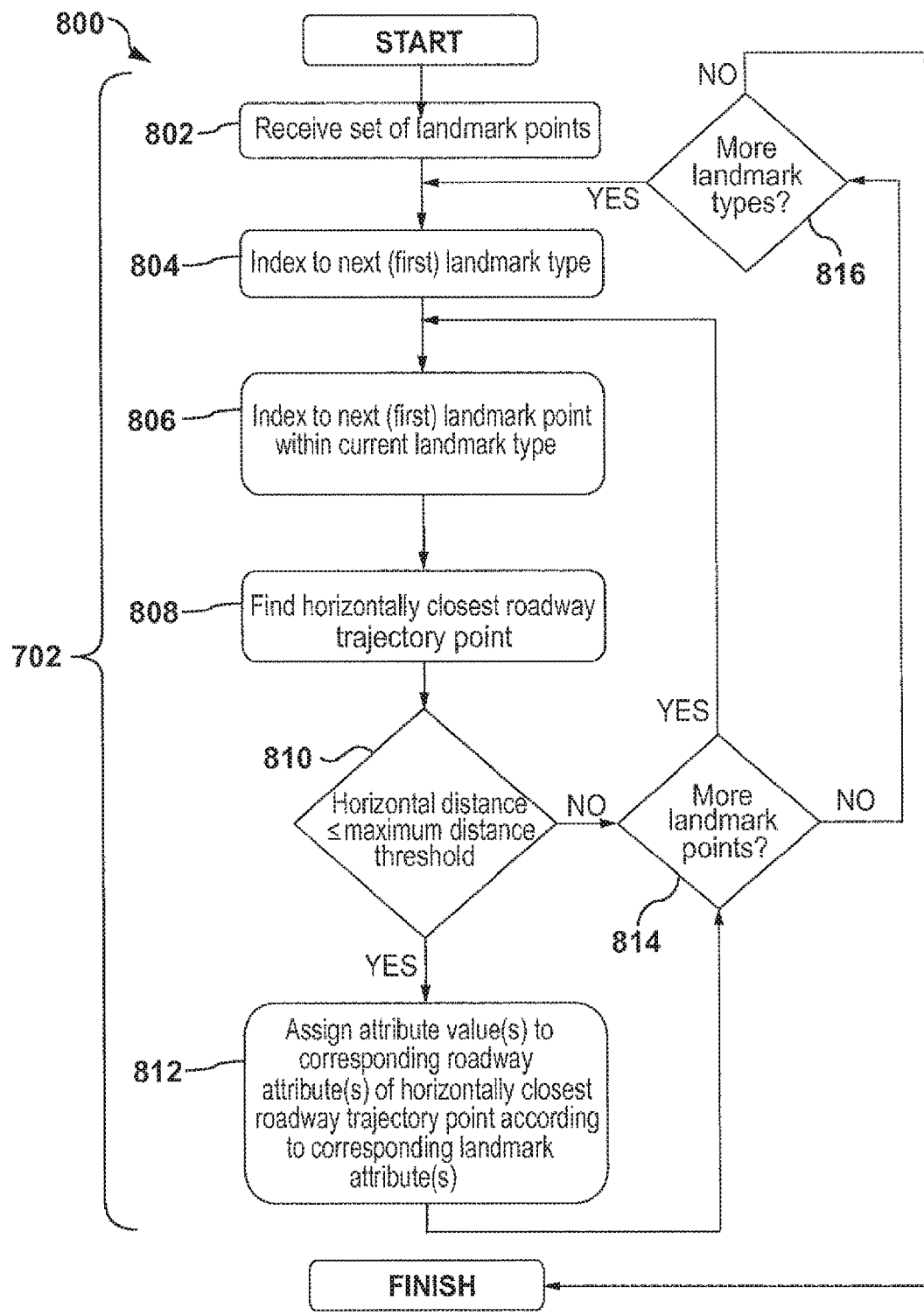
FIG. 8 is a flow chart showing an exemplary method for evaluating non-geometric roadway attributes.

FIG. 8 is a flow chart showing an exemplary elaboration of step 702, illustrating an exemplary method 800 for evaluating non-geometric roadway attributes; as noted above the method 800 will be implemented by a processor of a data processing system. At step 802, the processor receives a set of landmark points, which may comprise a plurality of landmark points of different landmark types. Each of the landmark points has a position in the same terrestrial coordinate frame as the roadway trajectory points. At step 804, the processor indexes to the next (or first) landmark type. In the illustrated embodiment, there are two broad categories of landmark types: object landmarks and property-change landmarks. Within these broad categories there are particular landmark types.

The following are examples of object landmark types:
highway entrance apices
highway exit apices
lane merge apices
lane split apices
lane divider markers with marker type
shoulder markers
traffic signs with sign type and position
traffic signals with signal type and position
symbols or text painted in lane with the meaning of the symbol or text
medians The following are examples of property-change landmark types:
road name change
road type change
road edge type change
shoulder drivability change
shoulder surface change
speed limit change The indexing order at step 804 is not particularly important as long as the method 800 eventually indexes through all object landmark types and all property-change landmark types. At step 806, the processor indexes to the next (or first) landmark point within the current landmark type.

Steps 808 and 810 determine associations between landmark points and roadway trajectory points. Associations between landmark points and roadway trajectory points are determined by finding the roadway trajectory point that is horizontally closest to a particular landmark point and applying a maximum distance threshold. A landmark point is associated with the roadway trajectory point in the interpolated point sequence to which the landmark point has the minimum horizontal distance if that minimum horizontal distance is no greater than a specified distance threshold. Thus, at step 808, the processor locates the roadway trajectory point that is horizontally closest to the current landmark point, and at step 810 the processor tests whether the horizontal distance between the current landmark point and the closest roadway trajectory point is less than or equal to the specified maximum distance threshold. Responsive to a "yes" determination at step 810, the processor proceeds to step 812. A "yes" determination at step 810 means that an association has been established between the current landmark point and the horizontally closest roadway trajectory point, and the processor proceeds to step 812 to assign attribute value(s) to the corresponding roadway attribute(s) of the horizontally closest roadway trajectory point according to the corresponding landmark attribute(s). It will be appreciated that the association test (steps 808 and 810) may equivalently be applied by testing whether the horizontal distance is less than (rather than less than or equal to) a maximum distance threshold; this is simply a function of setting the threshold value.

A "no" at step 810 means there is no roadway trajectory point in the interpolated point sequence for which the horizontal distance between the landmark point and the roadway trajectory point is less than or equal to the specified distance threshold (since the closest roadway trajectory point is further from the landmark point than the specified distance threshold). This means that the current landmark point is not associated with any roadway trajectory points in the interpolated point sequence, and the processor proceeds to step 814 to check if there are more landmark points of the current landmark type. If there are more landmark points of the current landmark type (a "yes" at step 814), the processor returns to step 806 to index to the next landmark point of the current landmark type. If there are no more landmark points of the current landmark type (a "no" at step 814), the processor proceeds to step 816 to check if there are more landmark types to evaluate. If there are more landmark types (a "yes" at step 816), the processor returns to step 804 to index to the next landmark type. If there are no more landmark types (a "no" at step 816), this means that all landmark points of all landmark types have been evaluated, and the method 800 ends.

For each type of object landmark, the attributed roadway trajectory points will have at least one corresponding roadway attribute. That roadway attribute is valued (e.g., 0 or 1, true or false)—one value means "an instance of the object is present" and the other means "no instance of the object is present." For any roadway trajectory point in the interpolated point sequence, that roadway attribute is set to the "an instance of the landmark is present" value if that point is associated with at least one landmark point of that type; otherwise, it is set to the "no instance of the object is present" value.

For an object landmark, there may be additional landmark attributes for which the roadway trajectory points have corresponding roadway attributes. Each landmark point of that type has values for those landmark attributes, and those values are copied over to the roadway attribute with which it is associated. Those roadway attributes are set to the null value for all roadway trajectory points that are not associated with at least one landmark point of that type; they may be initialized at the null value and changed only if an association is established at steps 808 and 810.

Each property-change landmark type has one attribute value, which is a value of the roadway property that it represents. The attributed roadway trajectory points have the same roadway attribute (one roadway attribute for each property-change landmark type).

For each property-change landmark, the corresponding roadway attribute is set to the landmark type's initial value for each roadway trajectory point from (and including) the first roadway trajectory point in the interpolated point sequence to (but not including) the first roadway trajectory point that is associated with a landmark point of that type.

The roadway trajectory point that is associated with the landmark point is assigned the attribute value of the landmark point, as are all following roadway trajectory points up to (but not including) the next roadway trajectory point that is associated with a landmark point of that type (or through to the end of the interpolated point sequence if there are no more point sequence points associated with a landmark point of that type). Each subsequent landmark point/roadway trajectory point association changes the attribute value in this manner.

The exemplary method 800 illustrates a logic flow in which the attribute values are assigned to each of the respective roadway trajectory points immediately following determination that a particular roadway trajectory point is associated with a particular landmark point. Other logic flows are also contemplated. For example, the logic flow may first determine all associations between roadway trajectory points and landmark points and, once all of the associations between the roadway trajectory points and the landmark points have been established, attribute values may then be assigned to the roadway trajectory points based on the associations.

When a roadway attribute point is associated with multiple object landmarks points of the same type, then roadway attributes of the sequence point are populated only from the object landmark point of that type to which it has the shortest horizontal distance—the other object landmark points of the same type are ignored. In rare cases, two landmark points of the same type may be associated with the same roadway trajectory point. For example, there may be a very short unpaved stretch on an otherwise paved stretch of shoulder, or there may be multiple painted symbols in close proximity. Special handling protocols can be deployed in such cases. For example, the protocols may depend on the type of landmark point, and may be automated or may flag the issue for human analysis and intervention.

Figure 9:
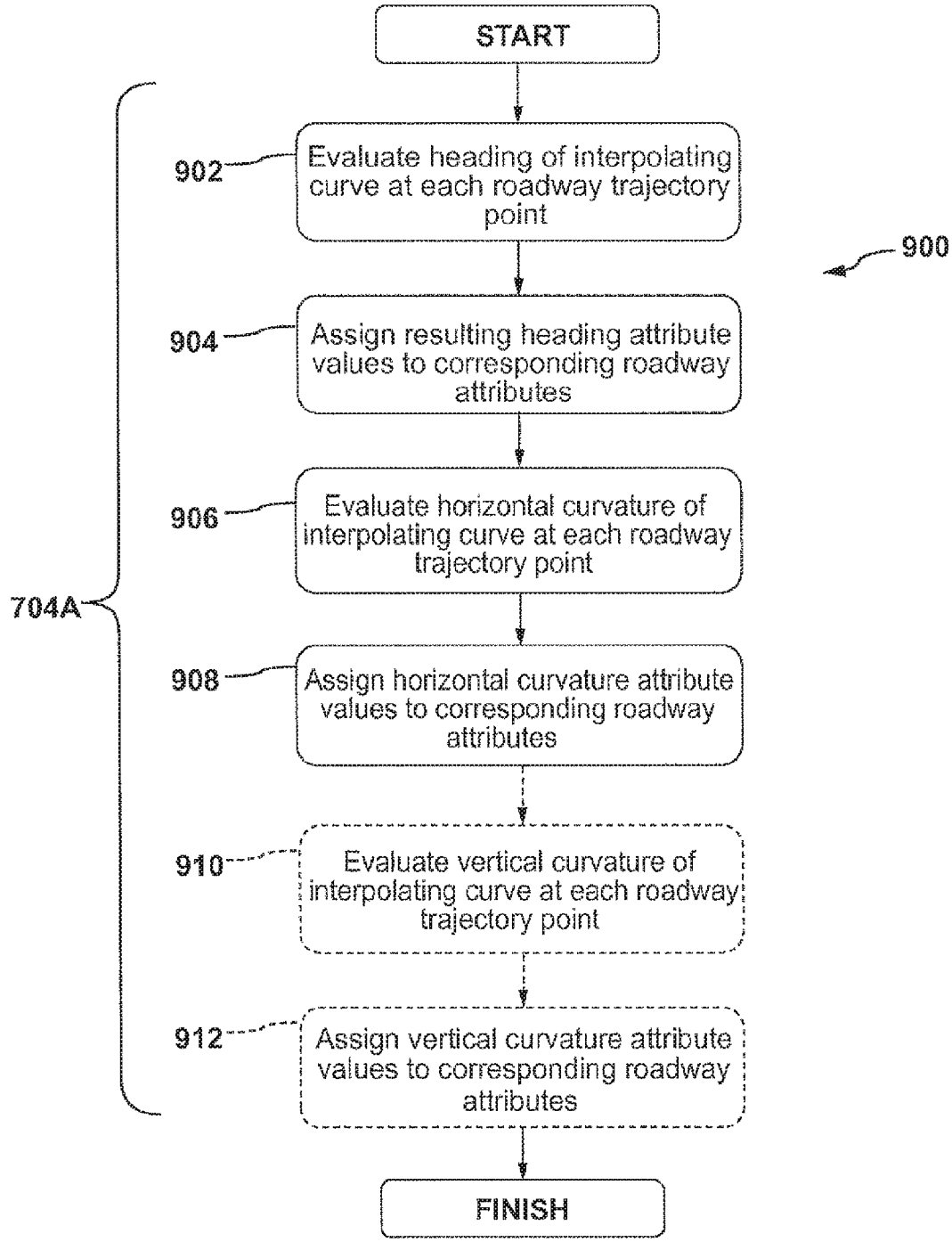
FIG. 9 is a flow chart showing an exemplary method for populating trajectory curve geometric roadway attributes.

Reference is now made to FIG. 9, which is a flow chart showing an exemplary method 900 that elaborates step 704A. As noted above, at step 704A, the processor populates trajectory curve geometric roadway attributes, that is, attributes of the interpolating curve on which the roadway trajectory points lie. Trajectory-curve geometric roadway attributes for a roadway trajectory point are evaluated from the curve at the location where it intersects the roadway trajectory point. The most important trajectory-curve geometric roadway attributes are heading and horizontal curvature; trajectory vertical curvature may also be evaluated.

If the terrestrial coordinate frame of the interpolated point sequence has spherical coordinates (i.e., degrees latitude and longitude) for horizontal position, then before commencing the method 900, the coordinates of the interpolated point sequence are transformed to coordinates in a locally level Cartesian coordinate frame that captures the interpolated point sequence. As indicated previously, the method 900 is carried out by a processor of a data processing system.

At step 902, the processor evaluates the heading of the interpolating curve at each roadway trajectory point and at step 904 the processor assigns the resulting attribute values to the corresponding roadway attributes. One exemplary procedure for evaluating the heading will now be described.

The heading roadway attribute value for a position t along the interpolating curve, heading(t), is the angle in degrees between the positive y-axis and the projection of the interpolating curve tangent vector at position t onto the xy-plane, measured clockwise with the positive y-axis pointing at "12" and the positive x-axis pointing at "3", adjusted for divergence as explained below. This will result in the heading value conforming to navigational convention. One exemplary method for calculating heading(t) is described below.

Let:
- $dx(t)$, $dy(t)$, and $dz(t)$ be the first derivatives of the interpolating curve with respect to position along the curve at position t;
- a tan 2(x, y) be a function that returns the angle in radians from the x-axis of a plane and the point given by the coordinates (x, y) on it. The angle is positive for counter-clockwise angles (upper half-plane, y>0), and negative for clockwise angles (lower half-plane, y<0);
- rad_to_deg=180.0/pi, the factor that converts radians to degrees; and
- grid_heading(t) be the angle in degrees between the positive y-axis and the projection of the interpolating curve tangent vector at position t onto the xy-plane, measured clockwise with the positive y-axis pointing at "12" and the positive x-axis pointing at "3".

Then, grid_heading(t)=a tan 2(dx(t), dy(t))*rad_to_deg.

Note that grid_heading(t) only points exactly north if t is such that x(t)=0, y(t)=0. Let divergence(x, y) be the heading of a horizontal vector at (x, y) that points in the same direction as the y-axis. Then, heading(t)=grid_heading(t)+divergence(x(t), y(t)).

A divergence(x, y) function for any ellipsoid may be based on the following procedure:
1. Transform the (x, y) coordinates into (longitude, latitude) coordinates for the ellipsoid.
2. Increment the latitude coordinate by a small amount (e.g., 0.25 degrees) to get latitude'.
3. Transform (longitude, latitude') to (x', y') in the Cartesian coordinate frame.
4. Return −a tan 2(x, y)*rad_to_deg.

Divergence may be calculated in other ways as well.

At step 906, the processor evaluates the horizontal curvature of the interpolating curve at each roadway trajectory point and at step 908 the processor assigns the resulting attribute values to the corresponding roadway attributes. One exemplary procedure for evaluating the horizontal curvature will now be described.

The horizontal curvature for a position t along the interpolating curve, hcurvature(t), is the curvature of the projection of the interpolating curve on the xy-plane. The calculation of hcurvature(t) is described below.

Let:
- $d2x(t)$, $d2y(t)$, and $d2z(t)$ be the second derivatives of the trajectory curve with respect to position along the curve at position t,
- $a=dx(t)*dx(t)+dy(t)*dy(t)$, and
- sqrt(x) be a function that returns the square root of x.

Then, $hcurvature(t)=(dx(t)*d2y(t)-dy*d2x(t))/sqrt(a*a*a)$.

At optional step 910, the processor evaluates the vertical curvature of the interpolating curve at each roadway trajectory point and at optional step 912 the processor populates the corresponding roadway attribute; methods for calculating the vertical curvature will be apparent to one skilled in the art, now informed by the present disclosure, and are not described further. After step 912 (or after step 908 if steps 910 and 912 are omitted), the method 900 ends.

The exemplary logic flow for the method 900 first determines the heading for all roadway trajectory points and then determines the horizontal curvature for all roadway trajectory points (and then optionally the vertical curvature for all roadway trajectory points). In other embodiments these steps may be performed in a different order or in parallel, and/or the heading, horizontal curvature (and optionally vertical curvature) may be populated for each roadway trajectory point before proceeding to the next roadway trajectory point.

As noted above, at step 704B the processor populates road surface geometric roadway attributes. Examples of road surface geometric roadway attributes for particular roadway trajectory points in the interpolated point sequence include road surface height, road surface along-trajectory slope, and road surface cross-trajectory slope. The predefined characteristics associated with these roadway attributes are evaluated from the coordinates of a height-filtered set of point cloud points within a specified horizontal distance of the point sequence point (height-filtering is described in the following paragraph). So, for example, road surface height would be evaluated from the average height coordinate of the height-filtered set of point cloud points, and road surface along-trajectory slope and cross-trajectory slope would be evaluated from the upward road surface normal vector that is calculated from the coordinates of the height-filtered set of point cloud points (as explained further below). The upward road surface normal vector is a vector pointing away from the Earth and normal to a notional plane that is locally tangent to the road surface at the horizontal position of the relevant roadway trajectory point.

In some cases, the set of point cloud points within a specified horizontal distance of point sequence points may include point cloud points that do not sample the road surface. For example, point cloud points that sample an overhead surface where the road passes under an overpass or is in a tunnel, points that sample a vehicle on the roadway, "noise" or "air" point cloud points that result from imperfections in the LIDAR sensing and do not sample any physical surface. A height filtering technique may be applied to exclude such point cloud points from the evaluation of road surface geometric roadway attributes.

Figure 10:
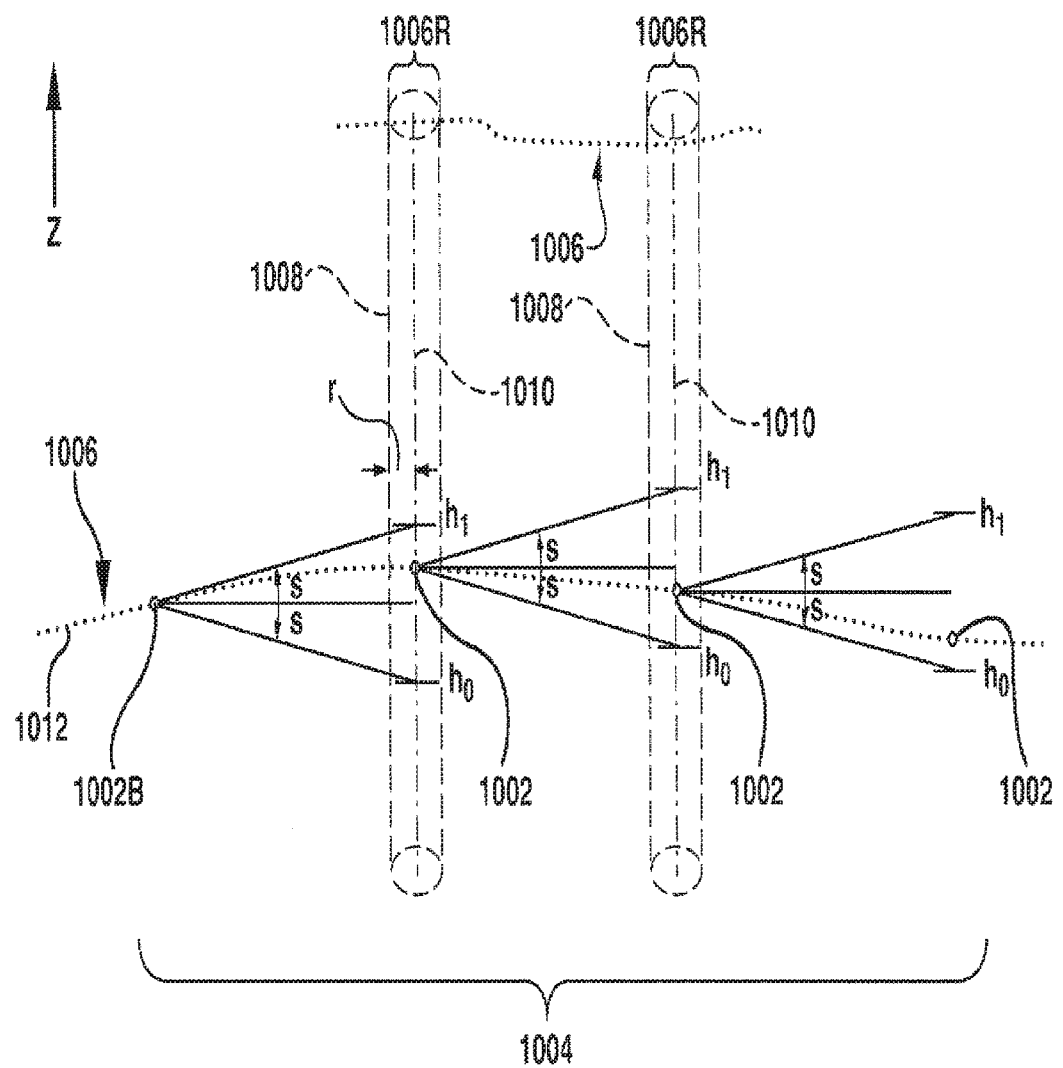
FIG. 10 schematically illustrates an exemplary height filtering technique

Reference is now made to FIG. 10, which schematically illustrates an exemplary height filtering technique. This technique requires that a benchmark roadway trajectory point 1002B in the interpolated point sequence 1004 be placed in a location where only point cloud points sampling the road surface exist in its neighbourhood and that the neighbourhood contains no less than a threshold number of point cloud points 1006 (which will depend on the density and noisiness of the point cloud). The neighbourhood may be conceptualized as a notional cylinder 1008 of defined radius r and infinite length whose axis 1010 is parallel with the z-axis of the locally level Cartesian coordinate frame and intercepts the roadway trajectory point. Ideally, the benchmark roadway trajectory point 1002B is the first roadway trajectory point in the interpolated point sequence 1004. A threshold along-trajectory absolute slope value s can then be used to filter out point cloud points 1006 associated with the next roadway trajectory point 1002 that do not sample the road surface 1012. A threshold along-trajectory absolute slope value is typically specified manually, and is designed to identify a height differential between nearby point cloud points that is caused by features other than the roadway surface. For example, point cloud points representing a vehicle or an overpass will result in a slope far exceeding any expected slope of the roadway surface itself. Point cloud points that define slopes exceeding the along-trajectory absolute slope value can then be excluded. For any roadway trajectory point in the interpolated point sequence, a maximum and minimum height interval [ho . . . h1] is calculated from the threshold along-trajectory absolute slope value s, the road surface height value for the closest preceding roadway trajectory point 1002 that has a height-filtered neighbourhood with at least the threshold number of point cloud points 1006, and the curve distance between the two roadway trajectory points 1002. The point cloud points in the neighbourhood set of the current roadway trajectory point 1002 that are outside of the maximum and minimum height interval, as illustrated by point cloud points 1006R, are removed from the set.

If a particular roadway trajectory point has too few point cloud points remaining in its neighbourhood after application of the filter, the road surface geometric roadway attributes may be populated by interpolating between nearby roadway trajectory points. For example, a roadway trajectory point may correspond to a position in the point cloud where the road surface is occluded from the LIDAR sensor, such as by another vehicle. For any roadway trajectory point whose height-filtered neighbourhood of point cloud points contains fewer than the threshold number of point cloud points, the road surface geometric roadway attributes are populated by interpolating the attribute values for the nearest preceding and successive roadway trajectory points whose height-filtered neighbourhood of point cloud points contains at least the threshold number of point cloud points.

Figure 11:
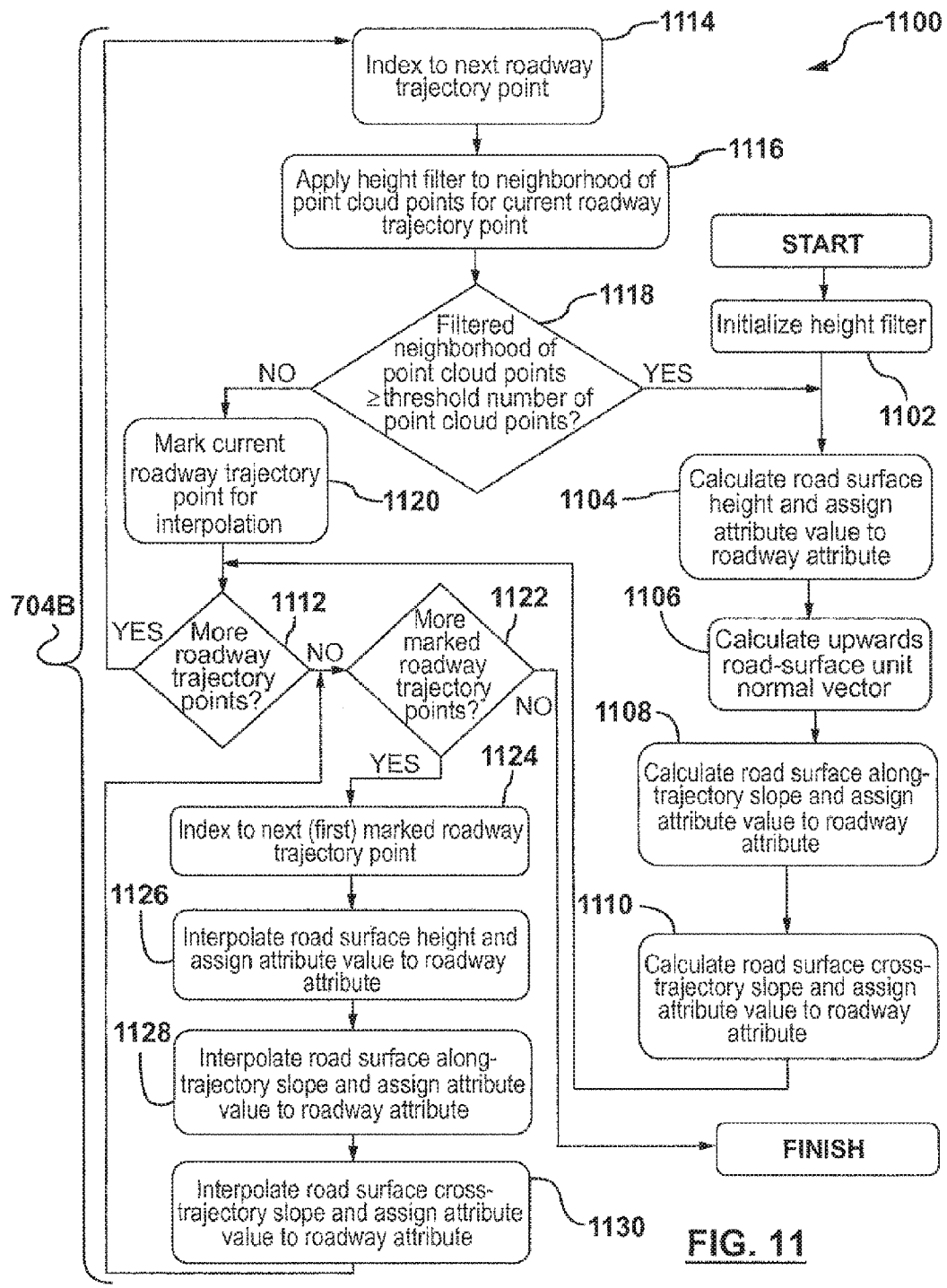
FIG. 11 is a flow chart showing an exemplary method for populating road surface geometric roadway attributes.

Reference is now made to FIG. 11, which is a flow chart 1100 showing an exemplary elaboration of step 704B, that is, population of road surface geometric roadway attributes. The exemplary method 1100, with the possible exception of step 1102, is carried out by a processor of a data processing system.

At step 1102, the height filter is initialized by selecting the benchmark roadway trajectory point and setting the threshold along-trajectory absolute slope value; one or both of these may be done manually. At step 1104, the processor calculates the road surface height as the average height coordinate of the height-filtered set of point cloud points, and then assigns this attribute value to the corresponding road surface attribute. The processor then proceeds to step 1106 to calculate the upwards road surface unit normal vector.

The upwards road surface unit normal vector can be estimated from a height-filtered neighbourhood of point cloud points with one of several algorithms. Exemplary algorithms are taught by Rusu, Rad Bogdan, "*Semantic 3D Object Maps for Everyday Manipulation in Human Living Environments*," doctoral dissertation, Computer Science Department, Technische Universitaet Muenchen, Germany, October 2009, the teachings of which are hereby incorporated by reference. This unit normal vector will have x, y, and z components nx, ny, and nz, respectively, in the Cartesian coordinate frame.

Let:

heading(t) be calculated as described above;

tp be the position of the roadway trajectory point (measured parametrically along the interpolating curve to conform to the variable heading(t))

deg_to_rad=pi/180.0, the factor that converts degrees to radians, rad_to_deg=180.0/pi, the factor that converts radians to degrees, r=heading(tp)*deg_to_rad, cos(a) and sin(a) be functions that return the cosine and sine, respectively, of radian angle a, and a tan 2(x, y) be a function that returns the angle in radians x-axis of a plane and the point given by the coordinates (x, y) on it. The angle is positive for counter-clockwise angles (upper half-plane, y>0), and negative for clockwise angles (lower half-plane, y<0).

Then, the components of the unit normal vector in the starboard and forward directions (relative to driving direction) are, respectively, rnx=cos(r)*nx−sin(r)*ny and rny=sin(r)*nx+cos(r)*ny.

The processor then proceeds to step 1108 to calculate the road surface along-trajectory slope and then to step 1110 to calculate the road surface cross-trajectory slope; steps 1108 and 1110 may be equivalently carried out in the reverse order or in parallel. At each of steps 1108 and 1110, the processor also assigns the respective calculated attribute value to the corresponding road surface attribute. The road surface along-trajectory slope in degrees (positive if climbing, negative if descending) is surfasl=rad_to_deg*−a tan 2(rny, nz) and the road surface cross-trajectory slope in degrees (positive if banking to starboard, negative if banking to port) is sufxsl=rad_to_deg*a tan 2(rnx, nz).

After step 1110, the processor proceeds to step 1112 to check if there are more roadway trajectory points whose road surface geometric roadway attributes have yet to be examined. If there are no more roadway trajectory points to examine (a "no" at step 1112) the processor proceeds to step 1122, described below; if there are more roadway trajectory points to examine (a "yes" at step 1112), the processor proceeds to step 1114 to index to the next roadway trajectory point.

After step 1114, at step 1116 the processor applies the height filter to the neighborhood of point cloud points for the current roadway trajectory point, and then proceeds to step 1118 to test whether the filtered neighborhood of point cloud points has at least the threshold number of point cloud points. It is noted here that steps 1116 (applying the height filter) and 1118 (testing whether the filtered neighborhood of point cloud points has at least the threshold number of point cloud points) are not applied to the benchmark roadway trajectory point selected at step 1102 (initializing the height filter) since these steps were already at least implicitly performed in selection of the benchmark roadway trajectory point.

If the processor determines at step 1118 that the filtered neighborhood of point cloud points has at least the threshold number of point cloud points (a "yes" at step 1108), the processor then proceeds to steps 1104, 1106 and 1108 for the current roadway trajectory point; exemplary implementations of these steps are described above.

If the processor determines at step 1118 that the filtered neighborhood of point cloud points does not have at least the threshold number of point cloud points (a "no" at step 1108), the processor then proceeds to step 1120 where the current roadway trajectory point is marked to have its road surface geometric attributes evaluated by interpolation. The interpolation of road surface height, road surface across-trajectory slope and road surface along-trajectory slope for a roadway trajectory point whose neighbourhood has fewer than the threshold number of height filtered point cloud points can only be done after those attributes have been explicitly evaluated for roadway trajectory points before and after that roadway trajectory point. After step 1120, the processor then continues to step 1112 to check for more roadway trajectory points to examine. After a "no" at step 1112, indicating that all the roadway trajectory points have been examined and have either been assigned road surface geometric attribute values (steps 1104 to 1110) or have been marked to have their road surface geometric attribute values assigned by interpolation (step 1120), the processor continues to step 1122. Step 1122 checks if there are any more roadway trajectory points that have been marked to have their road surface geometric attribute values assigned by interpolation but for which interpolation has not yet been performed. Responsive to a "yes" determination at step 1122, the processor proceeds to step 1124 to index to the next (or first) marked roadway trajectory point, and then to steps 1126, 1128 and 1130 to interpolate the road surface height, road surface along-trajectory slope and road surface cross-trajectory slope, respectively, and assign the interpolated attribute values to the respective roadway attributes. Steps 1126, 1128 and 1130 may be performed in any order or in parallel. After step 1130, the processor returns to step 1122. Responsive to a "no" determination at step 1122, indicating that interpolation has been performed for all roadway trajectory points that were marked to have their road surface geometric attribute values assigned by interpolation, the method 1100 ends.

The result of the method 700, which is an elaboration of step 604 of the method 600 (itself an elaboration of step 108 of the method 100), is an attributed roadway trajectory. An attributed roadway trajectory can provide sensor-independent roadway data to the control system of a self-driving road vehicle. The term "sensor-independent roadway data", as used herein, refers to data about a roadway that the control system of a self-driving road vehicle obtains independently of the vehicle's sensor array. As such, the attribute values of the attributed roadway trajectory points are sensor-independent roadway data. Sensor-independent roadway data may include data of a type that cannot be discerned by the sensor array of a self-driving road vehicle, such as legal information (e.g. shoulder drivability). Sensor-independent roadway data may include data of a type that could be obtained from data gathered by the sensor array of a self-driving road vehicle (e.g. along-trajectory slope and/or cross-trajectory slope). However, sensor-independent roadway data of a type that could be gathered by the sensor array of a self-driving road vehicle is distinguished therefrom in that it was not actually gathered by the sensor array of that self-driving road vehicle (even if it was gathered by sensors on a different vehicle); sensor-independent roadway data is data about a roadway that is provided to a control system of a self-driving road vehicle independent of the sensor array of that self-driving road vehicle.

Sensor-independent roadway data can be made available to the control system of a self-driving road vehicle for positions that are outside of the range of the self-driving road vehicle's sensor array. This has utility in a number of aspects of automated driving.

In one example, information on the horizontal curvature and slopes (road surface cross-trajectory slope and road surface along-trajectory slope) on upcoming stretches of road that are beyond sensor range can be used by the vehicle control system to gradually adjust the vehicle speed so that the vehicle is travelling at a speed compatible with those values when it reaches those stretches of road. For passenger comfort and the safety of proximal drivers, a smooth, gradual adjustment of vehicle speed is preferable to a sudden adjustment. In a highway context, this is particularly relevant when the vehicle is planning to take an exit onto an interchange.

In another example, information on the road surface along-trajectory slope of upcoming stretches of road outside of sensor range can be used to control the vehicle throttle such that constant speed is maintained for purposes of fuel economy.

Yet another example is that information on an upcoming speed limit change at a location beyond sensor range can be used by the vehicle control system to initiate a gradual adjustment of the vehicle's speed so that the vehicle is travelling no faster than the speed limit when it reaches the change. For passenger comfort and the safety of proximal drivers, a smooth, gradual adjustment of vehicle speed is preferable to a sudden adjustment.

Sensor-independent roadway data is also valuable to the control system even for nearby terrestrial positions, especially when the sensor-independent roadway data contains information that cannot be obtained from the onboard sensor array. For example, information on the location of the nearest drivable shoulder could be used by the vehicle control system to navigate the vehicle to a safe stop in the event of a blown tire.

Figure 12:
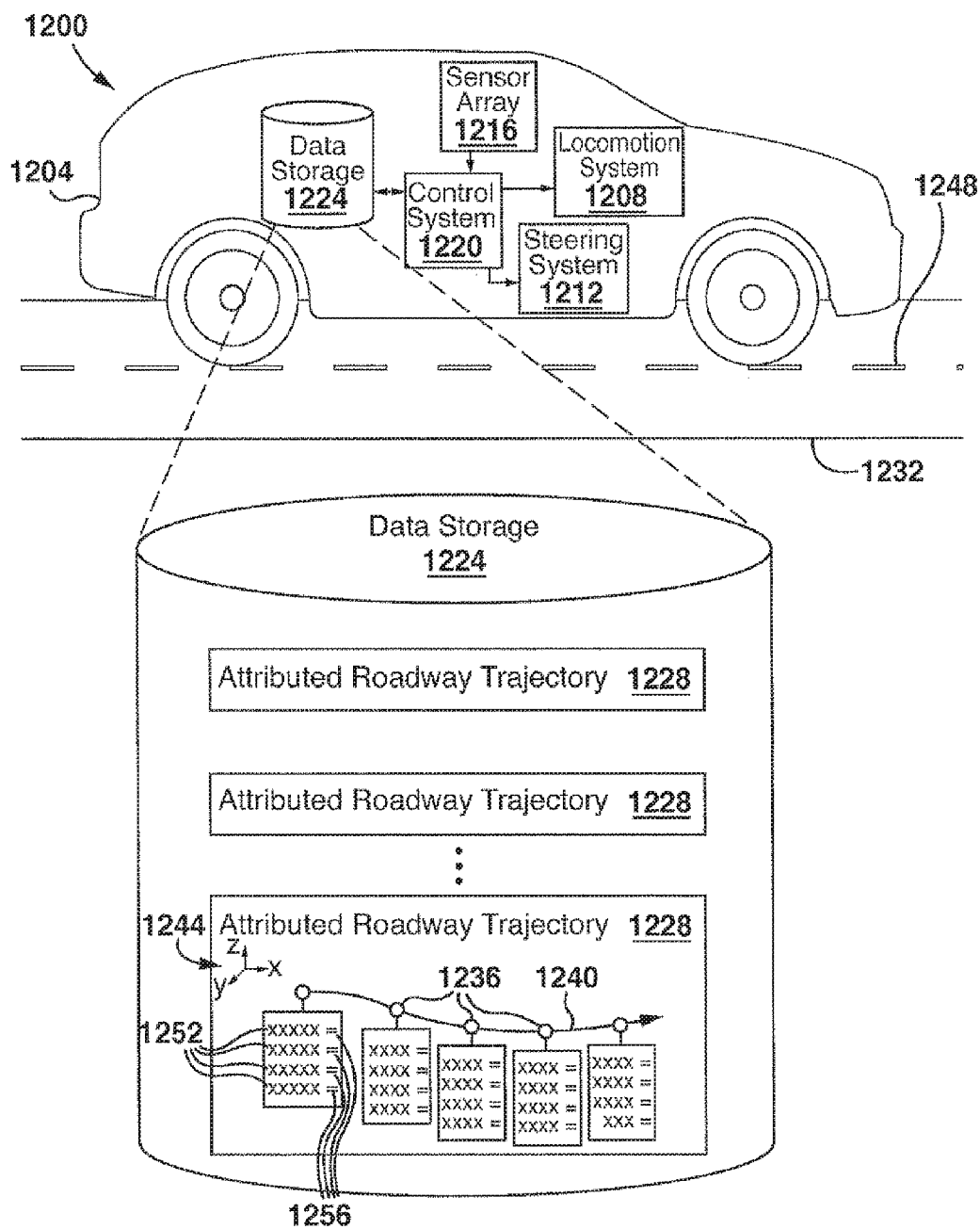
FIG. 12 is a schematic illustration of an exemplary self-driving road vehicle using an attributed roadway trajectory.

Reference is now made to FIG. 12, in which an exemplary self-driving road vehicle is indicated generally at 1200. The self-driving road vehicle 1200 is shown schematically, and various components and systems which are known in the art are omitted for brevity and simplicity of illustration.

The self-driving road vehicle 1200 comprises a body 1204, a locomotion system 1208, a steering system 1212, a sensor array 1216 and a control system 1220. The locomotion system 1208 is coupled to the body 1204 for accelerating, propelling and decelerating the self-driving road vehicle 1200 along a roadway, and the steering system 1212 is coupled to the body 1204 for steering the self-driving road vehicle 1200. The sensor array 1216 and the control system 1220 are both carried by the body 1204; the sensor array 1216 senses driving data and has a sensor range, that is, a range beyond which the sensor array 1216 is unable to resolve useful data. The sensor array 1216 may include, for example, radar, LIDAR, ultrasonic sensors, cameras (visual and/or thermal), gyroscopes, GPS receivers, inertial measurement systems, accelerometers, magnetometers and thermometers, among others.

The control system 1220 is coupled to the sensor array 1216 for receiving sensed driving data from the sensor array 1216, and may also communicate with conventional vehicle components such as an onboard computer system, speedometer, odometer, engine management system, traction control system, antilock braking system, tire pressure sensors, rain sensors, etc. The control system 1220 is also coupled to the locomotion system 1208 and the steering system 1212 for controlling those systems. A data storage module 1224 is coupled to and accessible by the control system 1220.

The data storage module 1224 stores a plurality of attributed roadway trajectories 1228 as described above, at least one of which is associated with the real-world roadway segment 1232 on which the self-driving road vehicle 1200 is driving. The attributed roadway trajectories 1228 may, for example, be organized with other data as connected components of a road network. Each attributed roadway trajectory 1228 comprises at least one ordered series of attributed roadway trajectory points 1236 that are spaced along a curve 1240 defined in a terrestrial coordinate frame 1244 and tracking an along-roadway physical feature, in this case a lane divider 1248, of the real-world roadway segment 1232, which was portrayed in a point cloud. For any arbitrary attributed roadway trajectory point 1236 on the curve 1240, that attributed roadway trajectory point 1236 passes a predetermined proximity test for proximity to point cloud points discriminated as representing part of the along-roadway physical feature (lane divider 1248 in this case). Each attributed roadway trajectory point 1236 has, in addition to its position in the terrestrial coordinate frame 1244, a plurality of roadway attributes 1252 each having respective attribute values 1256 representing characteristics of the real-world roadway segment 1232 at a position on the real-world roadway segment 1232 that is spatially associated with the respective attributed roadway trajectory point 1236.

The control system 1220 is configured to obtain, for at least one of the attributed roadway trajectory points 1236, at least one respective attribute value 1256 representing sensor-independent roadway data. The control system 1220 will use the attribute value(s) 1256 to adjust control of the locomotion system 1208 and/or the steering system 1212. In many cases, the control system obtains the attribute value(s) while the position of the attributed roadway trajectory point(s) 1236 in the terrestrial coordinate frame 1244 corresponds to a terrestrial position outside of the sensor range of the sensor array 1216, and adjusts control of the locomotion system 1208 and/or the steering system 1212 while the position of the attributed roadway trajectory point(s) 1236 in the terrestrial coordinate frame 1244 corresponds to a terrestrial position outside of the sensor range of the sensor array 1216. Some non-limiting examples of situations in which this control could be applied are set out above.

Figure 13:
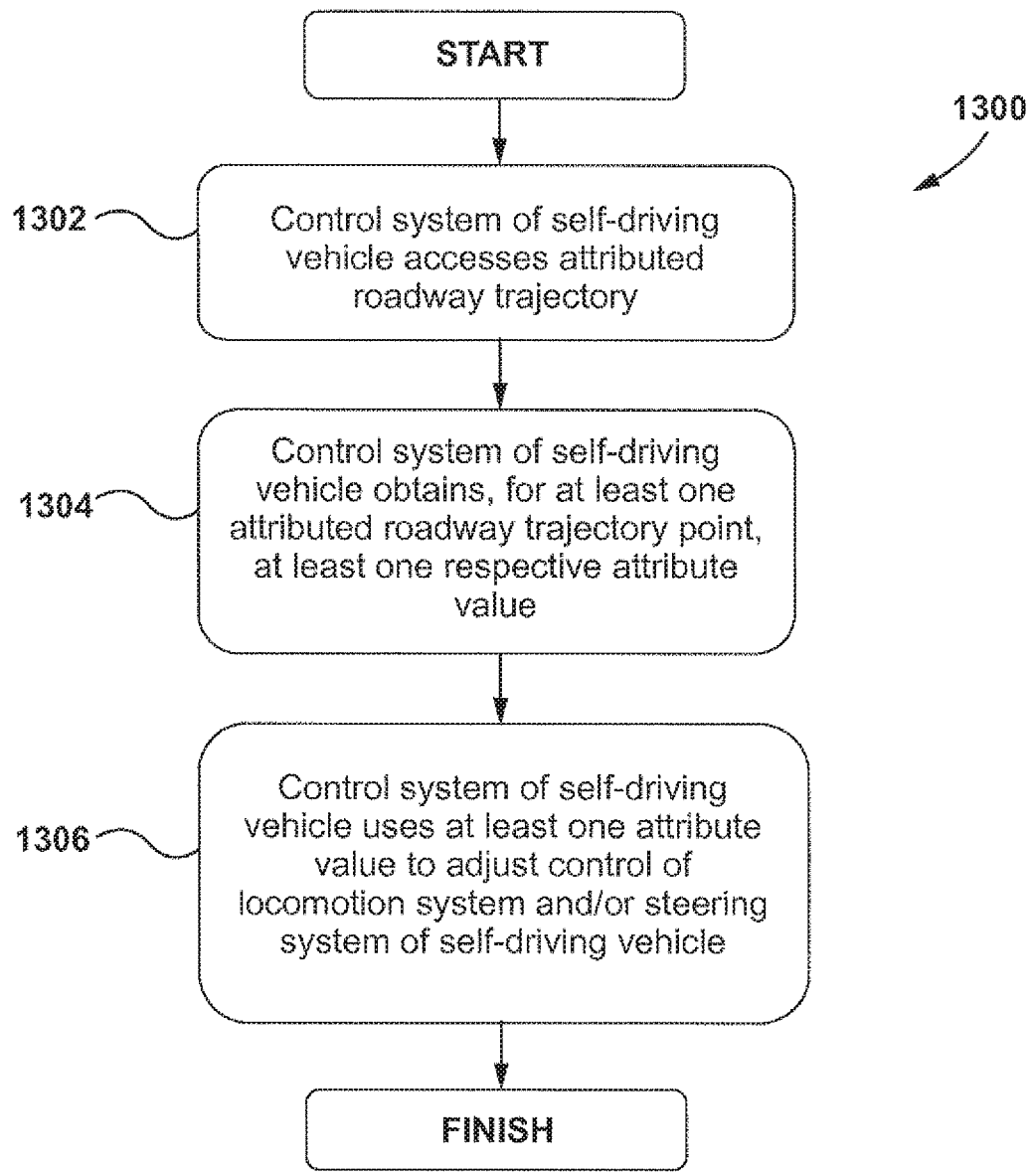
FIG. 13 is a flow chart showing an exemplary method for controlling a self-driving road vehicle.

Reference is now made to FIG. 13, which is a flow chart showing an exemplary method for controlling a self-driving road vehicle (e.g. self-driving road vehicle 1200 in FIG. 12). At step 1302, a control system (e.g. control system 1220) of the self-driving road vehicle accesses an attributed roadway trajectory of the type described above (e.g. attributed roadway trajectories 1228). At step 1304, the control system of the self-driving road vehicle obtains, for at least one of the attributed roadway trajectory points (e.g. attributed roadway trajectory points 1236), at least one respective attribute value (e.g. attribute values 1256). As noted above, in many cases the position of the attributed roadway trajectory point(s) in the terrestrial coordinate frame (e.g. terrestrial coordinate frame 1244) corresponds to a terrestrial position outside of the sensor range of the sensor array (e.g. sensor array 1216).

At step 1306, the control system of the self-driving road vehicle uses the at least one attribute value to adjust control of a locomotion system (e.g. locomotion system 1208) and/or a steering system (e.g. steering system 1212) of the self-driving road vehicle; in many cases this occurs while the position of the attributed roadway trajectory point(s) in the terrestrial coordinate frame corresponds to a terrestrial position outside of the sensor range of the sensor array 1216.

As can be seen from the above description, the attributed roadway trajectories described herein represent significantly more than merely using categories to organize, store and transmit information and organizing information through mathematical correlations. The attributed roadway trajectories are in fact an improvement to the technology of self-driving road vehicles, as they provide a compact and efficient data structure for spatially associating sensor-independent roadway data with terrestrial coordinates. This facilitates the ability of the control system of a self-driving road vehicle to use sensor-independent roadway data in performing its functions. The attributed roadway trajectory data structure is also versatile, as it can accommodate a very wide range of roadway attributes, and existing attributed roadway trajectories can be updated to add, change or remove roadway attributes. Moreover, the attributed roadway trajectory technology is applied by using a particular machine, namely a self-driving road vehicle. As such, the attributed roadway trajectory technology is confined to self-driving road vehicle applications.

The present technology may be embodied within a system (including a control system of a self-driving road vehicle), a method, a computer program product or any combination thereof. The computer program product may include a computer readable storage medium or media having computer readable program instructions thereon for causing a processor to carry out aspects of the present technology. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language or a conventional procedural programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present technology.

Aspects of the present technology have been described above with reference to flowchart illustrations and/or block diagrams of methods, apparatus (systems) and computer program products according to various embodiments. In this regard, the flowchart and block diagrams in the Figures illustrate the architecture, functionality, and operation of possible implementations of systems, methods and computer program products according to various embodiments of the present technology. For instance, each block in the flowchart or block diagrams may represent a module, segment, or portion of instructions, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Some specific examples of the foregoing may have been noted above but any such noted examples are not necessarily the only such examples. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 14:
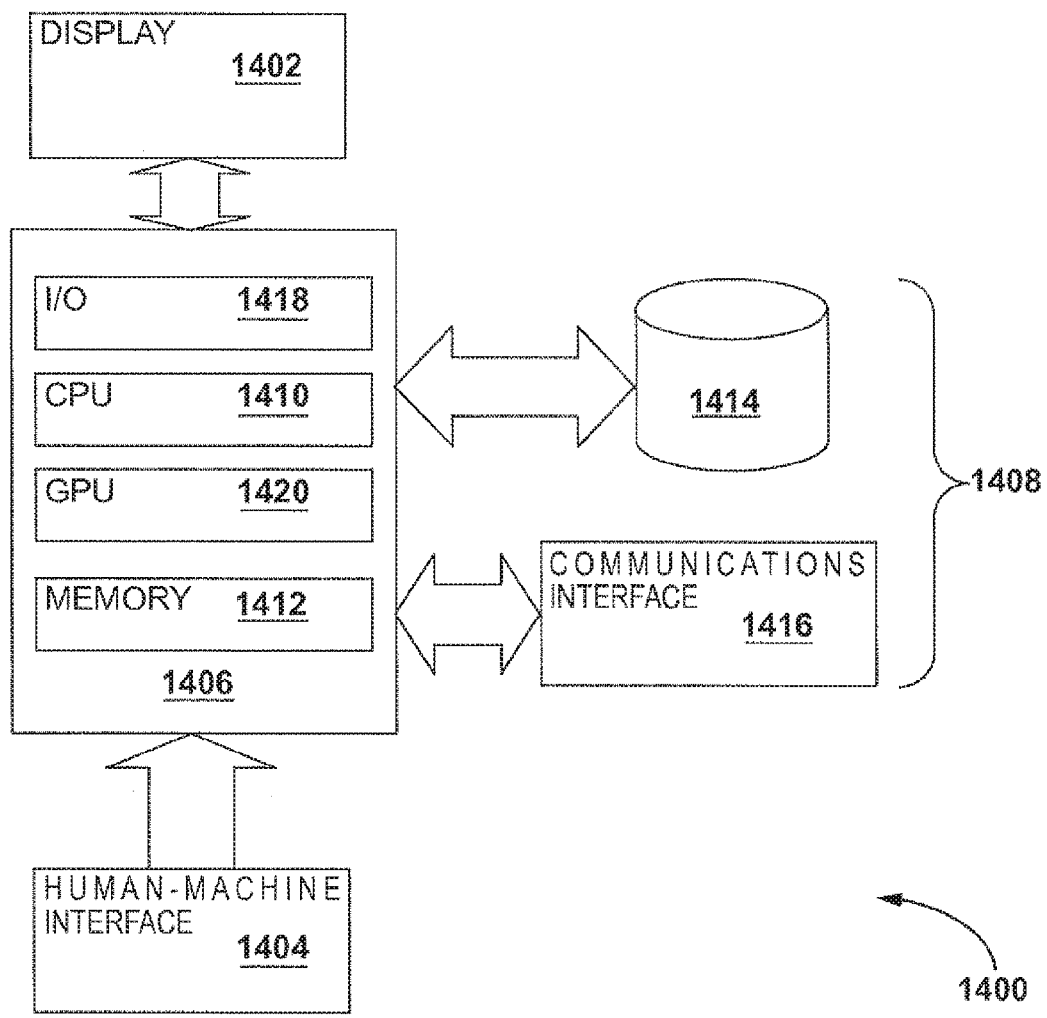
FIG. 14 is a schematic illustration of an exemplary computer system which can be used in implementing aspects of the present technology.

An illustrative computer system in respect of which the technology herein described may be implemented is presented as a block diagram in FIG. 14; computer systems are used in implementing the methods 100 and 600 and may also form part of a control system of a self-driving road vehicle (e.g. the control system 1220 of the self-driving road vehicle 1200 shown in FIG. 12). The illustrative computer system is denoted generally by reference numeral 1400 and includes a display 1402, one or more input devices forming a human-machine interface 1404, computer 1406 and external devices 1408. Different types of input device(s) and display(s) may be used where the computer system 1400 is configured to form part of a control system of a self-driving road vehicle. For example, information may be received from a touchscreen or by speech recognition. Gesture recognition is also emerging as another human-machine interface modality, as is tracking of the driver's eyes, both for data input (e.g. look at a button and blink) and also to monitor the state of the driver (e.g. an assisted-driving road vehicle may still require the driver to have his or her eyes on the road).

The computer 1406 may contain one or more processors or microprocessors, such as a central processing unit (CPU) 1410. The CPU 1410 performs arithmetic calculations and control functions to execute software stored in an internal memory 1412, preferably random access memory (RAM) and/or read only memory (ROM), and possibly additional memory 1414. The additional memory 1414 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 1414 may be physically internal to the computer 1406, or external as shown in FIG. 14, or both.

The computer system 1400 may also include other similar means for allowing computer programs or other instructions to be loaded. Such means can include, for example, a communications interface 1416 which allows software and data to be transferred between the computer system 1400 and external systems and networks. Examples of communications interface 1416 can include a modem, a network interface such as an Ethernet card, a wireless communication interface, or a serial or parallel communications port. Software and data transferred via communications interface 1416 are in the form of signals which can be electronic, acoustic, electromagnetic, optical or other signals capable of being received by communications interface 1416. Multiple interfaces, of course, can be provided on a single computer system 1400. A self-driving road vehicle may have multiple computing devices that communicate with one another. Traditionally, a controller area network (CAN) bus has been used for data exchange, although this is changing to more conventional networking. Some vehicles may use wireless communication to receive software updates from a vendor.

Input and output to and from the computer 1406 is administered by the input/output (I/O) interface 1418. This I/O interface 1418 administers control of the display 1402, human-machine interface 1404, external devices 1408 and other such components of the computer system 1400. Where the computer system 1400 forms part of a control system of a self-driving road vehicle, the I/O interface 1418 may also administer communication with the locomotion system, steering system and sensor array of a self-driving road vehicle. The computer 1406 also includes a graphical processing unit (GPU) 1420. The latter may also be used for computational purposes as an adjunct to, or instead of, the CPU 1410, for mathematical calculations.

The various components of the computer system 1400 are coupled to one another either directly or by coupling to suitable buses.

Thus, computer readable program code for implementing aspects of the technology described herein may be contained or stored in the memory 1412 of the computer 1406, or on a computer usable or computer readable medium external to the computer 1406, or on any combination thereof.

Finally, the terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is to be understood that where the specification or the claims refers to a device being "for" doing a particular thing, that device is adapted to do that particular thing.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope of the claims. The embodiment was chosen and described in order to best explain the principles of the technology and the practical application, and to enable others of ordinary skill in the art to understand the technology for various embodiments with various modifications as are suited to the particular use contemplated.

Certain currently preferred embodiments have been described by way of example. It will be apparent to persons skilled in the art that a number of variations and modifications can be made without departing from the scope of the claims. In construing the claims, it is to be understood that the use of a computer to implement the embodiments described herein, and in particular that an attributed roadway trajectory be used in a control system of a self-driving road vehicle, is essential.

What is claimed is:

1. A self-driving road vehicle, comprising:
  a body;
  a locomotion system coupled to the body for accelerating, propelling and decelerating the vehicle along a roadway;
  a steering system coupled to the body for steering the vehicle;
  a sensor array carried by the body for sensing driving data, the sensor array having a sensor range;
  a control system carried by the body, wherein:
  the control system is coupled to the sensor array for receiving sensed driving data from the sensor array;
  the control system is coupled to the locomotion system for controlling the locomotion system; and
  the control system is coupled to the steering system for controlling the steering system;
  a data storage module coupled to and accessible by the control system, the data storage module storing at least one attributed roadway trajectory;
  each attributed roadway trajectory comprising:
  at least one ordered series of attributed roadway trajectory points, wherein for each ordered series of attributed roadway trajectory points:
  each attributed roadway trajectory point has a position in a terrestrial coordinate frame;
  wherein the control system is configured to:
  obtain, for at least one of the attributed roadway trajectory points, at least one respective attribute value representing sensor-independent roadway data about a characteristic of a real-world roadway segment at a position on the real-world roadway segment that is spatially associated with the attributed roadway trajectory point; and use the at least one attribute value to adjust control of at least one of the locomotion system and the steering system.

2. The self-driving road vehicle of claim 1, wherein the control system is configured to:
obtain the at least one respective attribute value representing sensor-independent roadway data while the position in the terrestrial coordinate frame of the respective at least one of the attributed roadway trajectory points corresponds to a terrestrial position outside of the sensor range of the sensor array; and
use the at least one attribute value to adjust control of at least one of the locomotion system and the steering system while the position in the terrestrial coordinate frame of the respective at least one of the attributed roadway trajectory points corresponds to a terrestrial position outside of the sensor range of the sensor array.

3. The self-driving road vehicle of claim 1, wherein:
the at least one ordered series of attributed roadway trajectory points comprises a plurality of ordered series of attributed roadway trajectory points;
boundaries between the ordered series of attributed roadway trajectory points being defined by discontinuities between a preceding one of the series of attributed roadway trajectory points and a subsequent one of the series of roadway points;
wherein the discontinuities are associated with respective corresponding discontinuities in an along-roadway physical feature.

4. The self-driving road vehicle of claim 1, wherein the attributed roadway trajectory points are uniformly spaced.

5. The self-driving road vehicle of claim 1, wherein the at least one roadway attribute comprises at least one non-geometric roadway attribute.

6. The self-driving road vehicle of claim 1, wherein the at least one roadway attribute comprises at least one geometric roadway attribute.

7. The self-driving road vehicle of claim 6, wherein the at least one geometric roadway attribute comprises at least one road surface geometric roadway attribute.

8. The self-driving road vehicle of claim 6, wherein the at least one geometric roadway attribute comprises at least one trajectory curve geometric roadway attribute.

9. A method for controlling a self-driving road vehicle, comprising:
a control system of the self-driving road vehicle accessing an attributed roadway trajectory, the attributed roadway trajectory comprising:
at least one ordered series of attributed roadway trajectory points, wherein for each ordered series of attributed roadway trajectory points:
each attributed roadway trajectory point has a position in a terrestrial coordinate frame;
the control system of the self-driving road vehicle obtaining, for at least one of the attributed roadway trajectory points, at least one respective attribute value representing sensor-independent roadway data about a characteristic of a real-world roadway segment at a position on the real-world roadway segment that is spatially associated with the attributed roadway trajectory point; and the control system of the self-driving road vehicle using the at least one attribute value to adjust control of at least one of the locomotion system and the steering system.

10. The method of claim 9, wherein
the control system of the self-driving road vehicle;
obtains the at least one respective attribute value representing sensor-independent roadway data while the position in the terrestrial coordinate frame of the respective at least one of the attributed roadway trajectory points corresponds to a terrestrial position outside of the sensor range of the sensor array; and
uses the at least one attribute value to adjust control of at least one of the locomotion system and the steering system while the position in the terrestrial coordinate frame of the respective at least one of the attributed roadway trajectory points corresponds to a terrestrial position outside of the sensor range of the sensor array.

11. The method of claim 9, wherein
the at least one ordered series of roadway trajectory points comprises a plurality of ordered series of attributed roadway trajectory points;
boundaries between the ordered series of attributed roadway trajectory points being defined by discontinuities between a preceding one of the series of attributed roadway trajectory points and a subsequent one of the series of roadway points, and
further wherein the discontinuities are associated with respective corresponding discontinuities in an along-roadway physical feature.

12. The method of claim 9, wherein the attributed roadway trajectory points are uniformly spaced.

13. The method of claim 9, wherein the at least one roadway attribute comprises at least one non-geometric roadway attribute.

14. The method of claim 9, wherein the at least one roadway attribute comprises at least one geometric roadway attribute.

15. The method of claim 14, wherein the at least one geometric roadway attribute comprises at least one road surface geometric roadway attribute.

16. The method of claim 14, wherein the at least one geometric roadway attribute comprises at least one trajectory curve geometric roadway attribute.

17. A system to control a locomotion system and a steering system of a self-driving road vehicle, the system comprising:
a sensor array for sensing driving data, the sensor array having a sensor range;
a control system coupled to the sensor array to receive sensed driving data from the sensor array, wherein the control system is coupled to the locomotion system and the steering system;
a data storage module coupled to and accessible by the control system to store at least one attributed roadway trajectory, wherein each attributed roadway trajectory includes at least one ordered series of attributed roadway trajectory points, and wherein, for each ordered series of attributed roadway trajectory points,
each attributed roadway trajectory point has a position in a terrestrial coordinate frame,
wherein the control system is configured to
obtain, for at least one of the attributed roadway trajectory points, at least one respective attribute value representing sensor-independent roadway data about a characteristic of the real-world roadway segment at a position on the real-world roadway segment that is spatially associated with the attributed roadway trajectory point, and use the at least one attribute value to adjust control of at least one of the locomotion system and the steering system.

* * * * *